United States Patent [19]

Peck

[11] 4,451,371

[45] May 29, 1984

[54] APPARATUS FOR SEPARATING LIQUID FROM A SLURRY

[76] Inventor: William H. Peck, 5604 W. Prue Rd., San Antonio, Tex. 78240

[21] Appl. No.: 456,862

[22] Filed: Jan. 10, 1983

[51] Int. Cl.³ .............................................. B01D 33/00

[52] U.S. Cl. .................................... 210/325; 210/374; 210/380.1

[58] Field of Search ..................... 210/325, 360.2, 367, 210/369–376, 378, 377, 380.1, 381, 385

[56] References Cited

U.S. PATENT DOCUMENTS

| | | | |
|---|---|---|---|
| 3,402,821 | 9/1968 | Peck | 210/325 |
| 3,627,138 | 12/1971 | Peck | 210/325 |
| 3,814,246 | 6/1974 | Wilson et al. | 210/380.1 X |
| 4,000,073 | 12/1976 | Camerino | 210/325 |
| 4,199,459 | 4/1980 | Filipowicz et al. | 210/325 |
| 4,283,286 | 8/1981 | Wilkesmann | 210/367 |

*Primary Examiner*—Thomas G. Wyse

*Attorney, Agent, or Firm*—Gerlach & O'Brien

[57] ABSTRACT

Apparatus for separating liquid from solids contained in a liquid-solid slurry includes a centrifugal concentrator which is supplied with feed slurry, and a centrifugal separator to which the output of the concentrator is conducted. The concentrator includes a rotatable central slurry reservoir having outlets discharging slurry under centrifugal force in streams nominally following spiral flow paths. Spirally-curved perforate vanes rotated with the reservoir and intersect respective slurry streams at acute angles. A fractional portion of the fluid in the slurry is removed by filtration as each stream intersects and then flows along a spirally-curved perforate vane, thereby to provide concentrated slurry, which is supplied to the separator. The separator includes a high-speed rotatable carrier, which carries eccentrically-disposed filter baskets independently rotatable at low speeds about their own axes. Each basket includes a base plate, and spirally-curved perforate vanes mounted on and extending outwardly from a central region of the base plate. A reservoir having restrictive outlets for discharge adjacent to the inner ends of respective vanes is mounted in juxtaposition to the central region of each basket, for rotation with the basket. Concentrated slurry from the concentrator is supplied to each basket reservoir, is discharged from the reservoir outlets, and flows radially outwardly of the carrier axis of rotation under the application of centrifugal force, when the carrier is rotated. With the concurrent flow rotation of each basket about its axis, the slurry is filtered substantially over the full length of each basket vane, with liquid passing through the vane and solids being retained on the vane surface, for discharge therefrom separately from the filtrate.

27 Claims, 16 Drawing Figures

APPARATUS FOR SEPARATING LIQUID FROM A SLURRY

BACKGROUND OF THE INVENTION

This invention relates to apparatus for separating liquid from a slurry. More particularly, the invention relates to apparatus including a centrifugal concentrator and a centrifugal separator, which may be employed successively for separating liquid from solids contained in a liquid-solid slurry.

Various solids recovery, transportation and treatment methods produce liquid-solid slurries from which the solids desirably are recovered substantially free of liquid. Such slurries include, for example, coal, potash, paper pulp, silica sand, sewage treatment product slurries, and others. The liquid content varies according to the type and source of the slurry.

Generally speaking, existing separators process the slurries as they come, in a single-stage unit. Examples of such separators are those disclosed in U.S. Pat. Nos. 3,402,821 and 3,627,138, which are centrifugal separators of the orbiting basket type, and the separator disclosed in U.S. Pat. No. 3,829,009, which is a solid bowl type of centrifuge.

The volumetric capacities of these separators are limited, correspondingly limiting the solids throughput or output of solids per unit of time. The limitations become increasingly disadvantageous economically as the liquid content of the slurries increases above the most efficient operating level, i.e., as the separators are required to handle increasing amounts of excess liquid in the slurries. Since the separators require substantial capital investment and occupy considerable plant space, it would be highly desirable to increase their solids throughput.

The separator of the above-reeferred to U.S. Pat. No. 3,402,821, having a perforated vane serving as a filter screeen in an orbiting basket thereof, also operates below its filtering capacity, in that the slurry flow pattern does not utilize the entire available filter area. It would be desirable, as well, to improve the utilization of the filter area of such separators.

SUMMARY OF THE INVENTION

This invention provides improved apparatus for separating liquid from solids contained in a liquid-solid slurry, which operates to maximize the solids throughput in processing slurries, which may range widely in liquid content, and is especially advantageous for slurries of high liquid content.

More particularly, apparatus is provided for separating liquid from a slurry in a two-stage continuous process, wherein the slurry is concentrated in a first stage to a higher solids content while remaining fluid, and liquid is removed from the concentrate in a second stage, to reduce it to product solids of low moisture content.

The apparatus includes a combination of a centrifugal concentrator of relatively simple construction, which effects a gross separation of a portion of the liquid from the slurry, to produce the concentrate, and a centrifugal separator of the orbiting basket type, which produces the low moisture solids from the concentrate.

The apparatus in the preferred combination is compactly constructed in a single unit, which occupies substantially no more space while greatly increasing throughout, as compared to the above-described prior separators. Construction, labor and energy costs based on throughput are markedly reduced.

More specifically, the apparatus of the invention includes a centrifugal concentrator and a centrifugal separator, each mounted on driven shaft means for conjoint rotation about the axis of the shaft means when driven. The concentrator includes a base plate centrally mounted on the shaft means for rotation about the axis thereof, and a feed slurry reservoir centrally mounted on the base plate for rotation therewith. The reservoir has, at its perimeter, a restrictive discharge outlet, whereby feed slurry is discharged from the reservoir in a stream nominally to follow a spiral flow path commencing at such outlet and continuing radially outwardly therefrom over the base plate when the base plate is rotated about the shaft means axis to impart centrifugal force to the slurry. The concentrator further includes a spirally-curved perforate vane mounted on its base plate for rotation therewith. The concentrator vane is disposed to intersect the slurry stream at an acute angle to the direction of flow, thereby to cause a fractional portion of the liquid in the slurry stream to pass through the vane therealong while the remainder of the stream travels along the vane to a radially outer concentrator discharge point, whereby the slurry is concentrated.

The separator includes a carrier centrally mounted on the shaft means for rotation about the axis thereof conjointly with the concentrator base plate. The separator further includes a basket assembly, comprising a filter basket and a feed slurry reservoir. The filter basket is eccentrically mounted on the carrier for orbital movement about the axis of the shaft means and for rotation about a centrally disposed basket axis in spaced parallel relation to the shaft means axis. The filter basket includes a base plate normal to and rotatable about the basket axis, and adapted to receive feed slurry on a central region thereof. A spirally-curved perforate vane of the basket is mounted on the basket plate for rotation therewith and extends radially outwardly from the central region of the base plate. The separator feed slurry reservoir is mounted in juxtaposition to the central region of the base plate for rotation with the base plate, and has, at its perimeter, a restrictive discharge outlet disposed adjacent to the radially inner end of the basket vane, for supplying slurry to the vane adjacent to such end. The slurry supplied to the separator feed slurry reservoir thereby is filtered by passage of liquid therefrom through the basket vane commencing adjacent to the inner end of the vane and continuing substantially for the full length of the vane, while solids from the slurry are retained on the vane surface, for discharge therefrom separately from the filtrate, upon rotation of the carrier about the axis of the shaft means at a relatively high rate imparting centrifugal force to the slurry and rotation of the basket about its own axis at a relatively low rate. Means are provided for conducting stream remainder from the concentrator discharge point to the separator feed slurry reservoir.

In preferred embodiments of the apparatus, a plurality of reservoir discharge outlets and a like plurality of vanes are provided on the concentrator; and a plurality of basket assemblies is provided in the separator, with each basket assembly having a plurality of reservoir discharge outlets and a like plurality of vanes.

The new concentrator and the new separator also are separately and independently used for processing slurries, and may be used either alone in a single stage process, or in combination with other liquid separation apparatus in a multistage process.

BRIEF DESCRIPTION OF THE DRAWINGS

The attached drawings illustrate preferred embodiments of the invention, without limitation thereto. In the drawings, like elements are identified by like reference symbols in each of the views, and.

DESCRIPTION OF THE PREFERRED EMBODIMENTS

Figure 1:
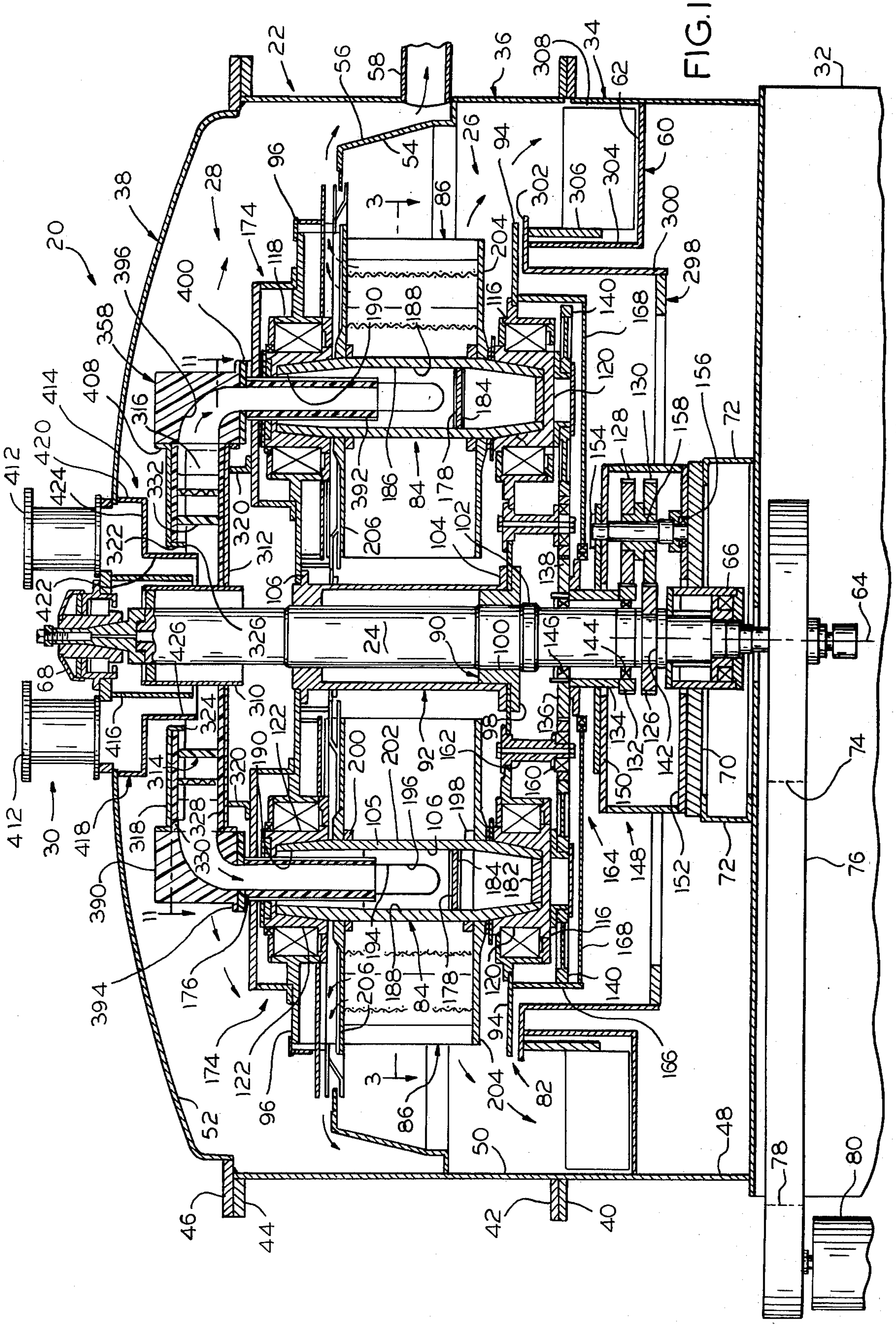
FIG. 1 is a vertical sectional view, taken generally centrally, with certain parts shown schematically, of apparatus according to the invention, which includes a concentrator and separator.
Figure 2:
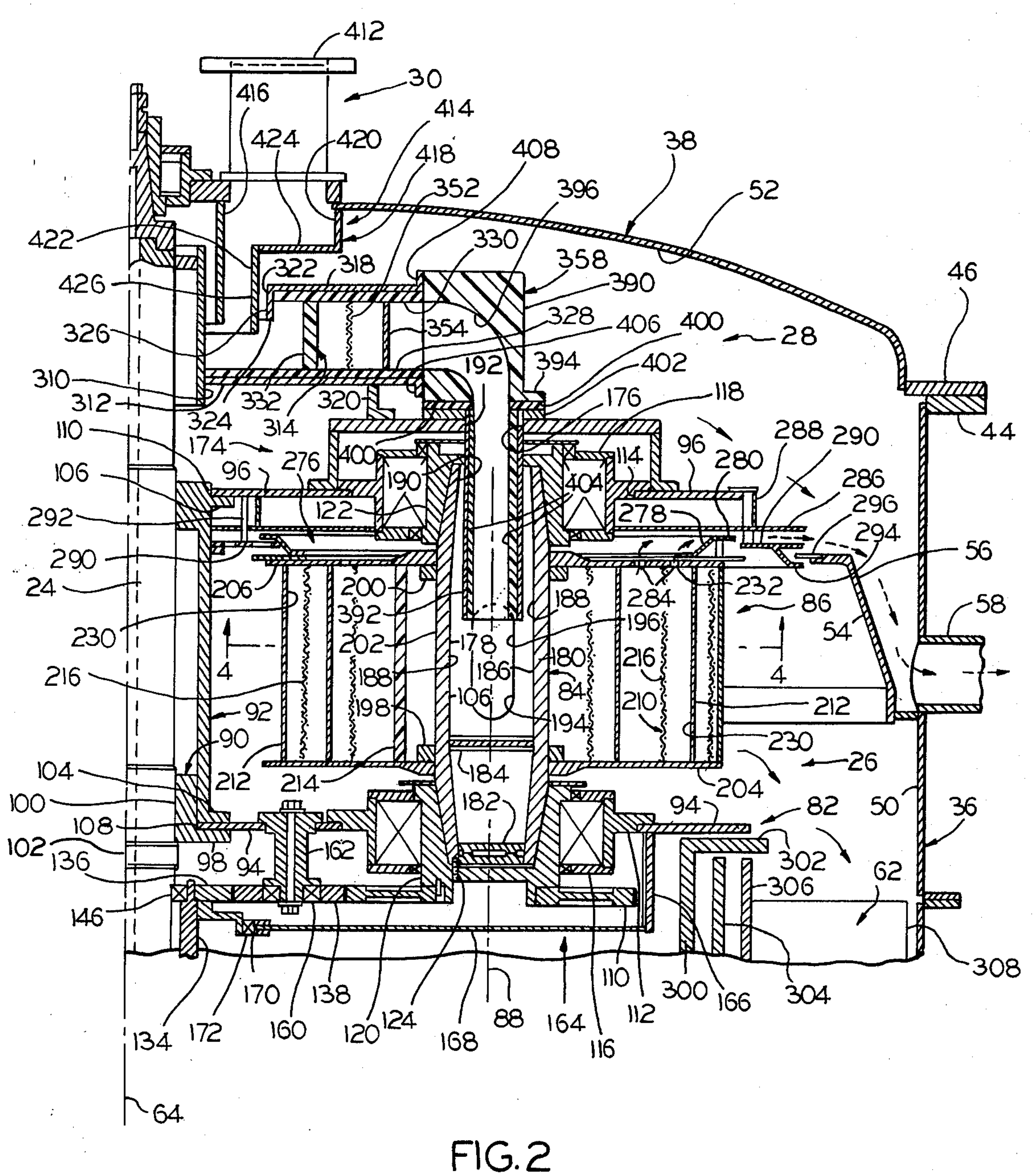
FIG. 2 is an enlarged, fragmentary, vertical sectional and partly schematic view of the apparatus, corresponding to the upper right-hand quadrant of FIG. 1.

Referring to FIGS. 1 and 2 of the drawings, an apparatus 20 for separating liquids from solids in accordance with the invention includes a stationary housing 22, a drive shaft 24 centrally and vertically mounted in the housing, a centrifugal separator 26 mounted on the drive shaft and driven thereby at a high rate of rotation, a centrifugal concentrator 28 mounted on the drive shaft above the separator and driven by the drive shaft at the same high rate of rotation as the separator, and a slurry feed assembly 30 mounted on the housing. Raw slurry from a source of supply is supplied to the feed assembly 30, which discharges the slurry into the concentrator 28. A portion of the liquid is removed from the slurry in the concentrator by filtration, to produce a concentrated slurry. The concentrate is conducted to the separator 26, which removes additional liquid by filtration, to provide product solids containing but a small amount of residual liquid.

The housing 22 is constructed of a structural base 32, a cylindrical lower casing 34 mounted on the base, a cylindrical upper casing 36 mounted on the lower casing, and a dome-like roof 38 mounted on the upper casing. Flat rings 40, 42, 44 and 46 are secured to the casings and roof therearound, as by welding, and project outwardly therefrom, respectively at the upper margin of the lower casing 34, the lower and upper margins of the upper casing 36, and the lower margin of the roof 38. The rings support adjacent components of the housing, one on top of the other, and are secured to adjacent rings by bolts or other suitable fastening means, not shown. The internal surface of the housing 22 as thus assembled includes an inner surface 48 of the lower casing 34, an inner surface 50 of the upper casing 36, and an inner surface 52 of the roof 38.

An upper apron 54 is mounted on the inner surface 50 of the upper casing 36 therearound, to form with the casing an annular liquid-collecting trough 56. A drain pipe or conduit 58 is mounted in a corresponding opening in the upper casing 36, in communication with the interior of the trough 56. A lower apron 60 is mounted on the inner surface 48 of the lower casing 34 therearound, to form with the casing an annular solids-collecting bin 62.

The drive shaft 24 is supported at its opposite ends for rotation about its longitudinal axis 64 by conventional lower and upper bearing assemblies 66 and 68, respectively. The lower bearing assembly 66 is mounted on a bearing support plate 70, in a central opening therein. The support plate 70 is supported on the base 32 by supports 72 in the form of channels. The lower bearing assembly includes both lateral and thrust bearings, for assimilating both horizontal and vertical loads. The upper bearing assembly 68 is mounted on the roof 38, in a central opening therein. A drive sheave 74 is keyed to the lower end portion of the drive shaft 24, and is coupled by a drive belt 76 to a sheave 78 driven by a drive motor 80, for rotating the drive shaft.

Figure 3:
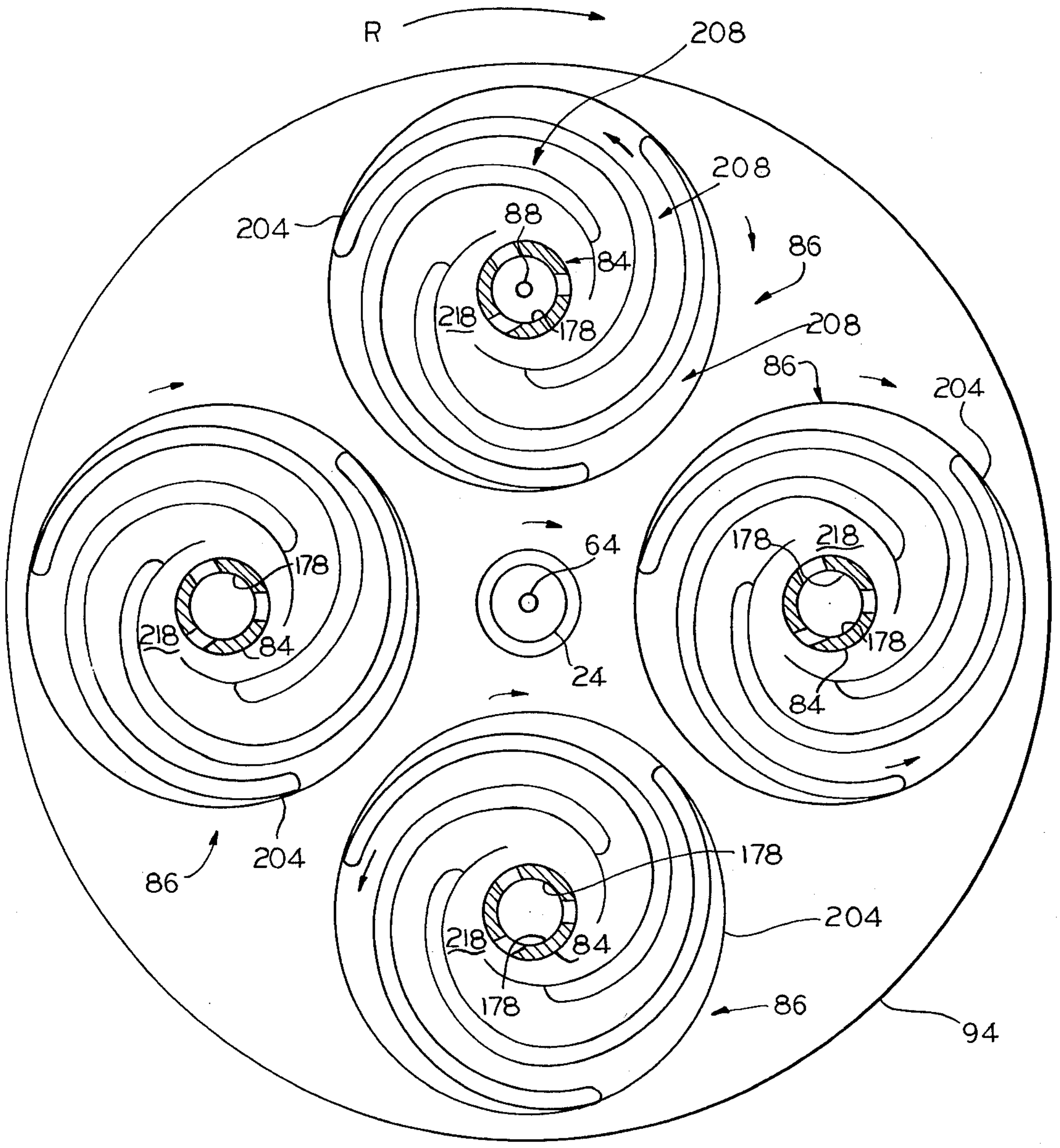
FIG. 3 is a downwardly-facing horizontal sectional view of the apparatus, showing the separator, taken substantially on line 3—3 of FIG. 1.

The centrifugal separator 26 is mounted on the middle or central section of the drive shaft 24 for rotation therewith. The separator includes a carrier 82 fixedly mounted on the drive shaft 24, four like vertically extending hollow basket shafts 84 rotatably mounted on the carrier, and four like filter baskets 86 fixedly mounted on respective basket shafts. The carrier 82 is centrally mounted on the drive shaft 24 for rotation therewith. The basket shafts 84 are eccentrically mounted on the carrier 82 with their axes 88 (FIGS. 2–4) in spaced parallel relationship to the axis 64 of the main drive shaft 24, for orbital movement about the axis of the drive shaft and for rotation about their own axes relative to the carrier. The filter baskets 86 are mounted on the basket shafts 84 for rotation therewith about the axes 88 thereof and for like orbital movement.

The carrier 82 includes a central collar 90 and a central sleeve 92, which are mounted on the drive shaft 24 therearound, and lower and upper annular disk-like basket-mounting members 94 and 96, respectively, which are mounted on the collar and the sleeve around the drive shaft 24. The collar 90 includes a radially extending annular flange 98 and a cylindrically-tubular neck 100. The collar is seated on an annular boss 102 provided on the drive shaft 24, and is fixed to the shaft for rotation therewith. The sleeve 92 includes radially extending lower and upper flanges 104 and 106, respectively. The lower end of the sleeve 92 telescopes over the neck 100 of the collar 90, and the sleeve is keyed to the drive shaft 24, for rotation therewith.

Referring especially to FIG. 2, the lower basket-mounting member 94 has a central opening 108 through which the neck 100 of the collar 90 extends, so that the mounting member seats on the collar flange 98. The lower flange 104 on the sleeve 92 seats on the lower mounting member 94. The flanges 98 and 104, and the lower mounting member 94 therebetween are secured together by bolts or other suitable fastening means, not shown. The upper basket-mounting member 96 has a central opening 110, which receives the upper end of the sleeve 92 therein, and the upper mounting member 96 seats on the upper flange 106 of the sleeve. The upper mounting member 96 and the latter flange 106 are fastened together by bolts or other suitable fastening means, not shown.

Each of the mounting members 94 and 96 has four equiangularly spaced apart openings 112 and 114, respectively, therein, which are equidistant from the drive shaft 24. Each opening 112 on the lower member 94 registers with an opening 114 on the upper member 96. Lower and upper basket shaft bearing assemblies 116 and 118 are mounted in respective openings 112 and 114. Shaft holders 120 and 122 are secured to the lower and upper ends, respectively, of each basket shaft 84, by screws 124 or the like. The shaft holders 120 and 122 are journalled in the lower and upper bearing assemblies 116 and 118, respectively, for rotatably mounting the basket shafts 84 in the lower and upper mounting members 94 and 96, respectively.

The basket shafts 84 are driven from the drive shaft 24 simultaneously at the same low rate of rotation about their axes 88, by means of a gear train coupling the drive shaft and each basket shaft. The gearing is similar to that described in the aforesaid U.S. Pat. No. 3,402,821 and provided for the like purpose of slowly rotating the filter baskets about their axes. Thus, referring to FIG. 1, the gear train to each basket shaft 84 includes a spur gear 126 fixed to the drive shaft 24; a pair of jointly rotating upper and lower fixed position idler gears 128 and 130, respectively, the lower idler gear 130 meshing with the spur gear 126; a hub gear 132 surrounding a hub 134 and keyed thereto, and meshing with the upper idler gear 128; a sun gear 136 also surrounding the hub 134 and keyed thereto; a travelling idler gear 138 meshing with the sun gear 136; and a planet gear 140 fixed to the lower shaft holder 120 and meshing with the travelling idler gear 138.

The spur gear 126 is fixedly mounted in a groove 142 around the drive shaft 24, and it actuates the remainder of the gear train to each basket shaft 84 when the drive shaft is driven by the motor 80, in operation. The hub 134 is mounted around the drive shaft 24 above the spur gear 126, coaxially with the shaft, and is freely rotatable about the shaft on lower and upper bearing assemblies 144 and 146, respectively, mounted on the shaft.

The spur gear 126, the fixed position idler gears 128 and 130, the hub gear 132, and the lower end of the hub 134 are enclosed by a lower gear box 148 mounted on the support plate 70. The gear box 148 includes respective top and bottom walls 150 and 152 in which are mounted bearing fittings 154 and 156. The fixed position idler gears 128 and 130 are rigidly mounted on a jack shaft 158, upper and lower ends of which are journalled for rotation in the bearing fittings 154 and 156. The travelling idler gear 138 rotates on a bearing assembly 160 mounted on a stub axle 162 fixed to and extending downwardly from the lower mounting member 94.

An upper gear box 164 is mounted on and depends from the lower mounting member 94. The gear box 164 includes a cylindrical side wall 166 and an annular bottom wall 168. The side wall 166 surrounds the lower basket shaft bearing assemblies 116, and the planet, travelling idler, and sun gears 140, 138 and 136 in the gear trains from the basket shafts 84. The bottom wall 168, having a central opening 170 (FIG. 2), sealingly engages a bearing assembly 172 carried by the hub 134 therearound, at the perimeter of the wall opening 170, to accommodate relative rotation between the upper gear box 164 and the hub. An annular bearing box 174 is mounted on the upper mounting member 96, around each upper bearing assembly 118 mounting a basket shaft 84. The bearing box 174 has a central circular opening 176 (FIG. 2).

Each basket shaft 84 provides a feed slurry reservoir 178 in the separator 26, supplying slurry to the filter basket 86 mounted thereon. Thus, referring to FIGS. 2 and 4, each basket shaft 84 includes a side wall 180, and a bottom wall 182 sealing the lower end of the hollow shaft. A transverse partition or false bottom 184 is spaced above the bottom wall 182. The partition 184 and the inner surface 186 of the side wall 180 define a reservoir cavity or holding space 188 above the partition, which cavity is accessible for supplying slurry thereto through an inlet opening 190 at the upper end of the shaft 84. The inlet opening 190 registers with a central opening 192 in the upper shaft holder 122 and with the bearing box opening 176.

Figure 4:
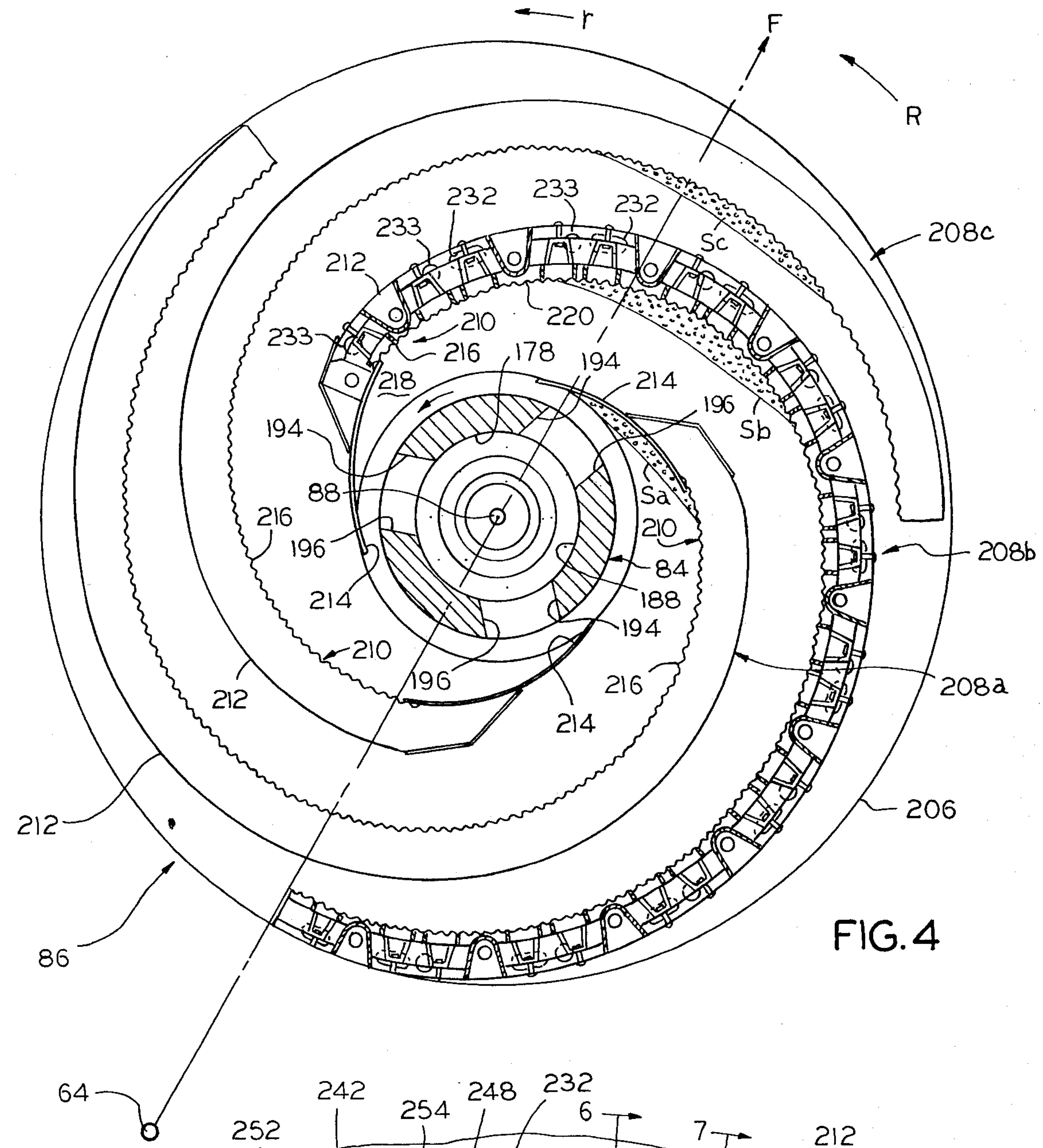
FIG. 4 is an enlarged, partly schemtic, fragmentary, upwardly-facing horizontal sectional view of a filter basket in the separator, with certain parts broken away and certain parts shown in phantom lines, taken substantially on line 4—4 of FIG. 2, with the relationship of the parts shown substantially to scale.

Each basket shaft 84 is constructed to provide three restrictive discharge outlets 194 at the perimeter of its reservoir 188. The outlets 194 define three like vertically elongate discharge openings 196 in the side wall 180, spaced apart equiangularly around the side wall and spaced a short distance above the partition 184. In the illustrative embodiment, the angular spacing of the inner edges of the substantially parallel sides of the openings 196, as seen in FIG. 4, preferably is about 55–60 degrees, and such edges are correspondingly spaced apart about 65–60 degrees between successive openings. For the purpose of mounting a filter basket 86 on each shaft 84, a pair of lower and upper mounting rings 198 and 200, respectively, are secured to the shaft on its outer surface 202. The lower ring 198 is spaced below and the upper ring 200 is spaced above the discharge openings 196.

Referring to FIGS. 1–7, the four filter baskets 86 are identical. Each basket 80 includes an annular disk-like base plate 204 centrally and fixedly mounted on the lower mounting ring 198 on a basket shaft 84, normal thereto, by bolts or other conventional fasteners (not shown), which extend through the base plate and the mounting ring. A similar annular disk-like roof or cover plate 206 is vertically spaced apart from, and parallel to, the base plate 204, and likewise is centrally and fixedly mounted on the upper mounting ring 200 on the basket shaft 84, normal thereto, by suitable fasteners.

Figure 5:
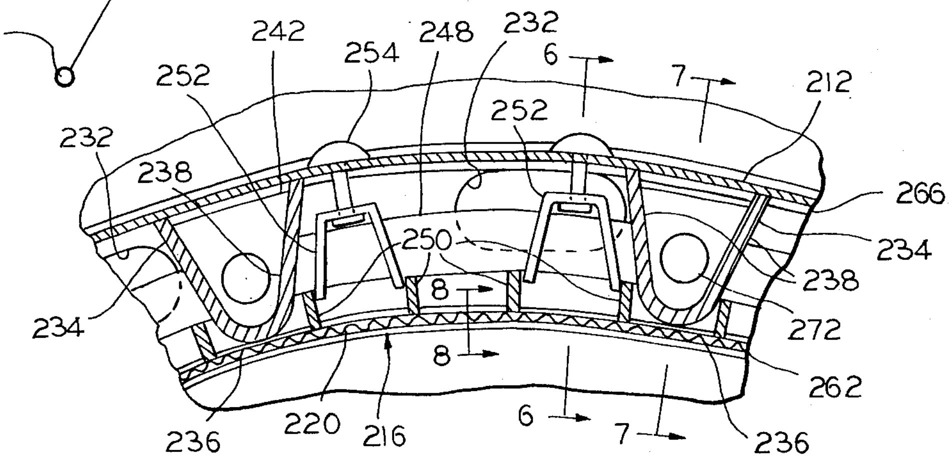
FIG. 5 is a further enlarged fragmentary, upwardly-facing detail view similar to FIG. 4, showing a vane assembly, taken substantially on line 5—5 of FIG. 6.

Referring to FIGS. 3–7 (of which FIGS. 4 and 5 are views looking upward), each basket 86 includes three identical spirally-curved vane assemblies 208, which are identified individually in FIG. 4 as 208*a*, 208*b* and 208*c*. The vane assemblies extend between and are fixedly mounted to the base and roof plates 204 and 206 of the basket for rotation therewith. Each vane assembly 208 includes a spirally-curved vane or vane proper 210 and a spaced, parallel spirally-curved baffle 212. Each vane 210 includes a leading imperforate impact member 214 and a trailing perforate filter screen member 216.

In the illustrative preferred embodiment, and as seen in FIG. 4, each vane 210 extends for approximately 315° around the common axis 88 of the basket shaft 84 and the basket 86. The impact member 214 extends for about 65°, representing a minor proportion of about 20.6% of the length of the vane, and the screen member 216 extends for about 250°, representing the remaining length of the vane. The baffle 212 is substantially coextensive with the screen member 216. Owing to the spiral curvature of the vane 210, the distance or radius from the axis 88 of the basket 86 to the vane increases from the leading end of the impact member 214 to the trailing end of the screen member 216. The curvature is adjusted so that the rate of increase in such distance decreases adjacent to the trailing end of the screen member 216, as illustrated in FIG. 4 and in FIG. 16.

Figure 16:
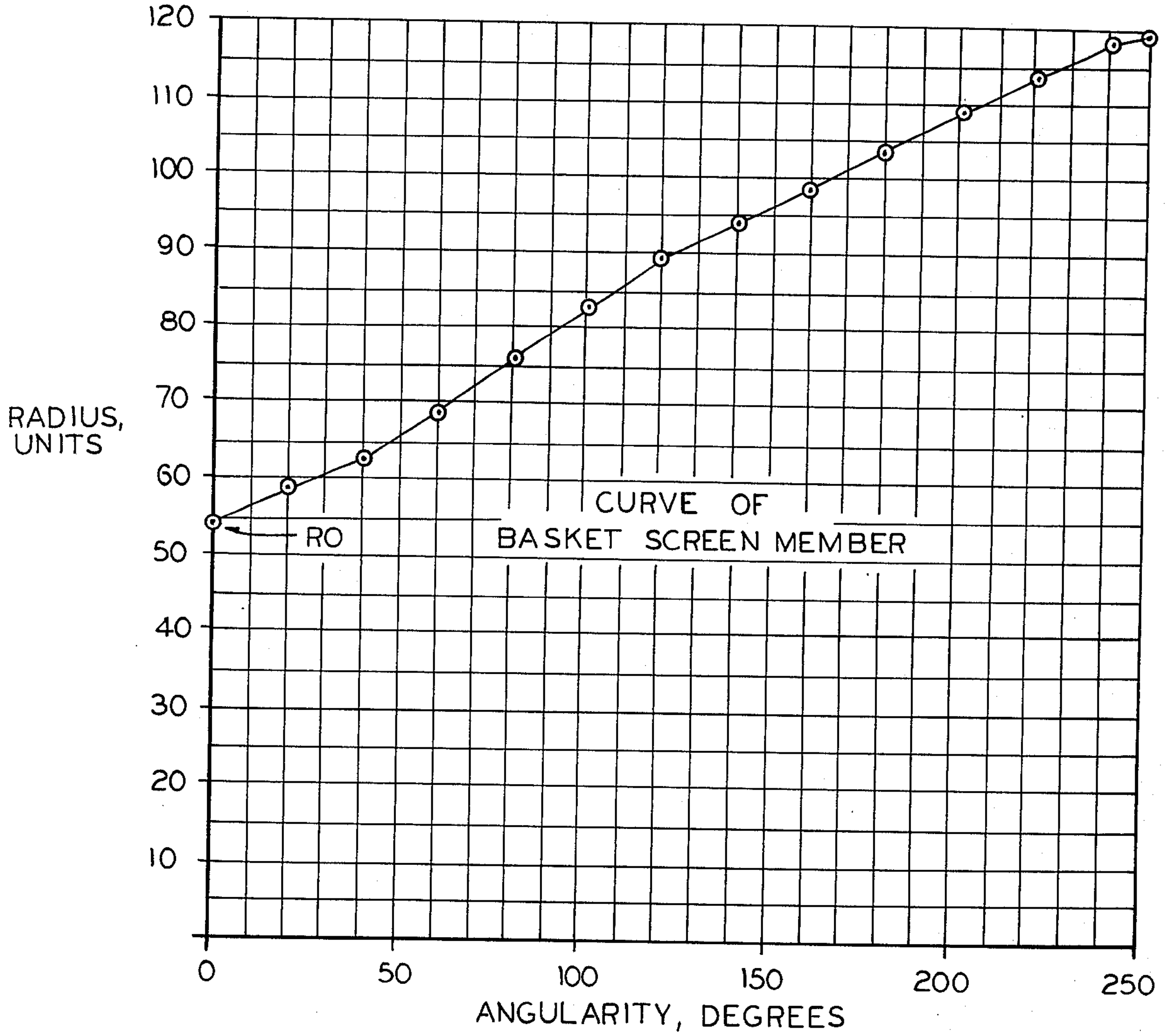
FIG. 16 is a graph showing the relationship of radius to angularity in a screen member of the vane in a vane assembly of a filter basket.

FIG. 4 illustrates a basket shaft 84 and a filter basket 86 substantially to scale, i.e., as respects the relationships of the parts, including vane assembly spacings and curvatures, and angularities. As a reference dimension, the diameter of the roof plate 206 in the illustrative embodiment is 41 inches. FIG. 16 is a graph of the radius of the filter screen member 216 from the basket axis 88, as a function of the angularity at the point at which the radius is measured, such angularity being measured from the leading end of the screen member 216, adjacent to the impact member 214. In the illustrative preferred embodiment, the radius RO of the screen member 216 at its leading end is 8.3 inches.

The several vanes 210 are arranged in angularly staggered overlapping relation around the basket axis 88, with the vane assemblies 208 in radially spaced apart relation. The vanes 210 encompass or define, and extend radially outwardly from, a central region 218 of the base plate 204, which region is adapted to receive slurry thereon. The feed reservoir 178 provided by the basket shaft 84 is in juxtaposition to the central region 218, for supplying slurry to the basket in such region. Slurry is discharged from the discharge outlets 194 of the reservoir 178, successively, as the basket shaft turns about its axis 88. Each outlet 194 discharges slurry along the vertical edges of the opening 196 thereof, to impinge upon and flow along a vane 210 across its width or height, and from its leading, radially inner end to its trailing, radially outer end. Liquid passes through the filter screen member 216 and into the vane assembly 208, from whence the filtrate is discharged from the basket 86. Solids travel along the surface of the vane 210, on the outside of the screen member 216, from whence the solids product is discharged separately from the filtrate.

The impact member 214 is constructed to absorb and withstand the impact of slurry on the vane 210 and also to have relatively high wear resistance under abrasive conditions. Preferably, the impact member 214 is constructed of a suitable sheet metal, such as stainless steel, coated with material having properties of resistance to impact and abrasion, such as a suitable polyurethane, ultra high molecular weight polyethylene, and the like. The impact members 214 of the vanes are located at the zones of greatest impact of slurry on the vanes, i.e., opposite to the reservoir discharge outlets 194. Preferably, the impact members 214 are separately replaceable.

Figure 6:
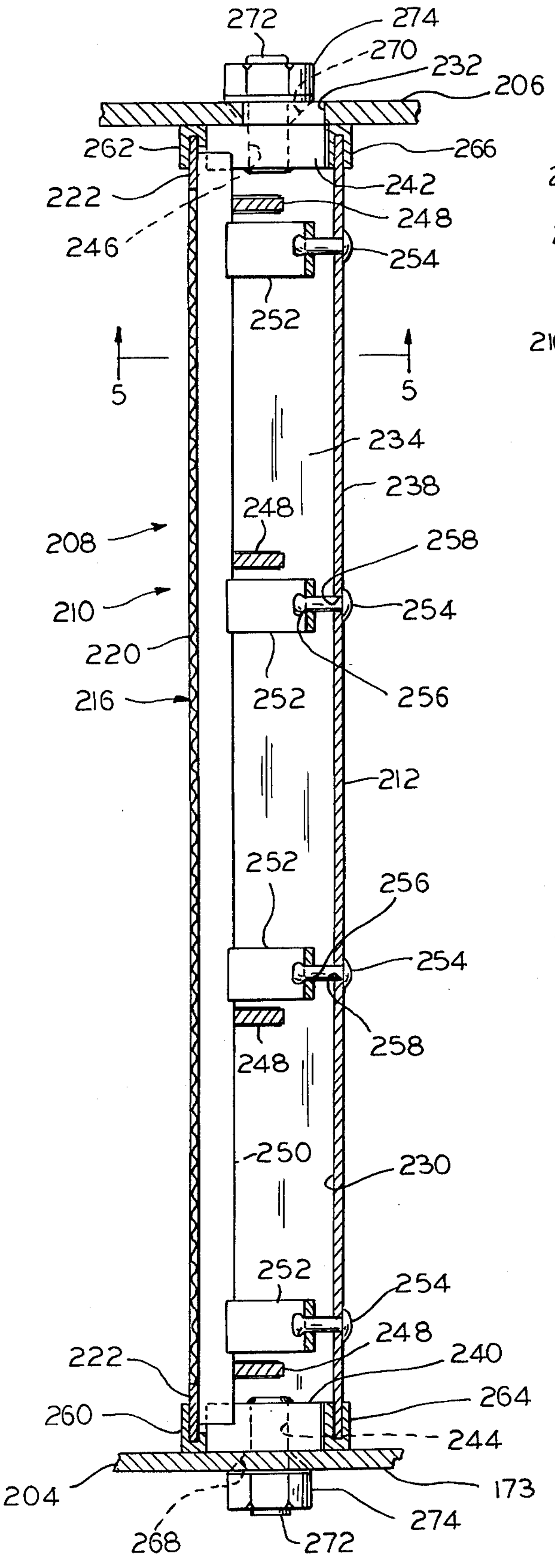
FIG. 6 is a similarly enlarged, upright vertical sectional view of the vane assembly, taken substantially on line 6—6 of FIG. 5.
Figure 7:
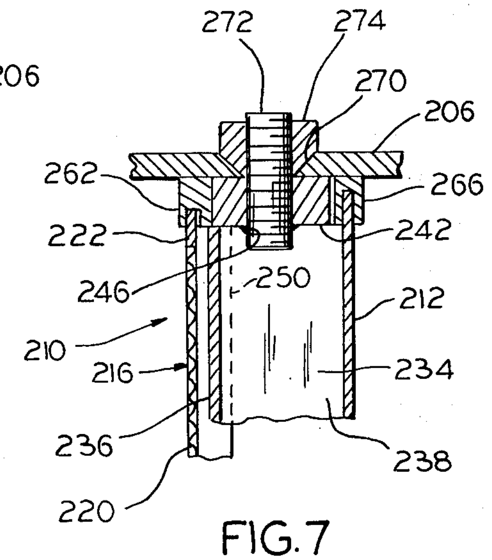
FIG. 7 is a fragmentary view similar to FIG. 6, but taken substantially on line 7—7 of FIG. 5.
Figure 8:
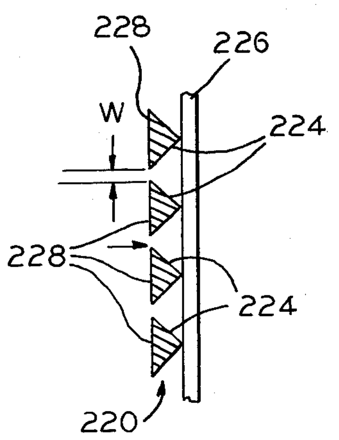
FIG. 8 is a further enlarged fragmentary vertical sectional view of a filter screen employed in a vane of the vane assembly, and also in a vane in the concentrator, taken substantially on line 8—8 of FIG. 5 and line 8—8 of FIG. 13.

Referring to FIGS. 6 and 7, the screen member 216 includes a conventional screen element 220 and rigid narrow strips 222 secured thereto along the upper and lower margins thereof. As illustrated in FIG. 8, the element 220 is constructed of closely spaced apart parallel wires 224 of triangular cross section, and spaced apart parallel circular wires or rods 226, crossing the triangular wires substantially at right angles thereto. Apices of the triangular wires 224 are secured to the circular wires 226 where they cross each other, as by brazing or welding. Flat bases 228 of the triangular wires form the outer surface of the element 220, which surface is presented to the slurry to be filtered. The spacing w between the triangular wires 224 is such as to reject solid particles larger than a desired minimum size, while liquid from the slurry is allowed to pass through the element 220. The element 220 preferably is constructed of material resistant to wear and corrosion, such as stainless steel.

The baffle 212 of each vane assembly 208 is constructed of imperforate sheet material, such as stainless steel, and it has substantially the same spiral curvature as the screen member 216. Extensions of the baffle 212, or like structure, serve to close the openings between the baffle and the screen member 216, at their opposite ends.

The base plate 204 and the roof plate 206 of each basket 86, and the screen member 216 and the baffle 212 of each vane assembly 208 together enclose a collection space 230 (FIGS. 2 and 6) into which liquid separated from slurry solids can enter. Liquid discharge openings 232 of oblong configuration, extend through the roof plate 206 in the area bounded by the screen member 216 and the baffle 212 of each vane assembly 208, in communication with the collection space 230. Preferably, the discharge opening area per unit of vane assembly length increases in the direction of the leading end of the vane assembly 208, where the proportion of liquid in the slurry and the quantity of filtrate are greatest, and for this purpose, additional circular discharge openings 233 are provided.

The manner in which each vane assembly 208 is assembled and mounted is illustrated in FIGS. 4–7. A series of vertically extending laterally spaced apart V-shaped channel irons 234 is employed for mounting the baffle 212. Each channel iron is disposed with its apex 236 adjacent to the screen member 216 and its legs 238 diverging therefrom to the baffle 212. The legs 238 are secured to the baffle, as by welding. Trapezoidally-shaped lower and upper mounting blocks 240 and 242, respectively, are secured, as by welding, to the horizontally extending lower and upper edges, respectively, of each channel iron 234. A tapped hole 244 extends vertically through each lower block 240, and a tapped hole 246 extends vertically through each upper block 242. Four inwardly convex, horizontally disposed, vertically spaced apart tension bars 248 extend between and are secured, as by welding, to the legs 238 of adjacent channel irons 234.

Generally parallel, laterally spaced apart, screen member-mounting bars 250 are secured, as by welding, to the inner surface of the screen member 216 and extend vertically substantially for the height thereof. Four vertically spaced apart, generally U-shaped mounting clips 252 are secured at their ends, as by welding, to respective mounting bars 250 in each of the successive pairs of bars. As seen most clearly in FIG. 6, the clips 252 are secured at their centers to the baffle 212 by rivets 254, which extend through registering holes 256 and 258 in the clips and the baffle, respectively. Each clip is adjacent to a tension bar 248, and the inner edges of the mounting bars 250 abut on the tension bars 248, in the vane assembly 208.

Resilient sealing gaskets 260 and 262 of U-shaped cross section receive therein the outer edges of the strips 222 at the lower and upper margins, respectively, of the screen member 216. Resilient sealing gaskets 264 and 266 of U-shaped cross section receive therein the lower and upper edges, respectively, of the baffle 212.

Tapered vane assembly mounting holes 268 and 270 are provided in the base and roof plates 204 and 206, respectively. The holes 268 and 270 are arranged to register with the respective tapped holes 244 and 246 in the lower and upper mounting blocks 240 and 242. Headless bolts 272 are inserted in the tapped holes 244 and 246, in threaded engagement with the mounting blocks 240 and 242, and tack-welded thereto. The bolts 272 extend through the mounting holes 268 and 270, into threaded engagement with wheel nuts 274 on the outer surfaces of the plates 204 and 206, to secure the vane assembly 208 to the plates therebetween, in sealing engagement therewith.

An advantage of the foregoing construction is that the screen member 216 may be replaced conveniently in the event of excessive wear or damage caused by abrasive slurry. Thus, the rivets 254 may be removed, as by drilling, following which the screen member 216 may be withdrawn from the basket 86 and replaced. Another advantage is that the channel irons 234 both perform mounting functions and serve to direct the flow of liquid to the discharge openings 232, 233.

Figure 10:
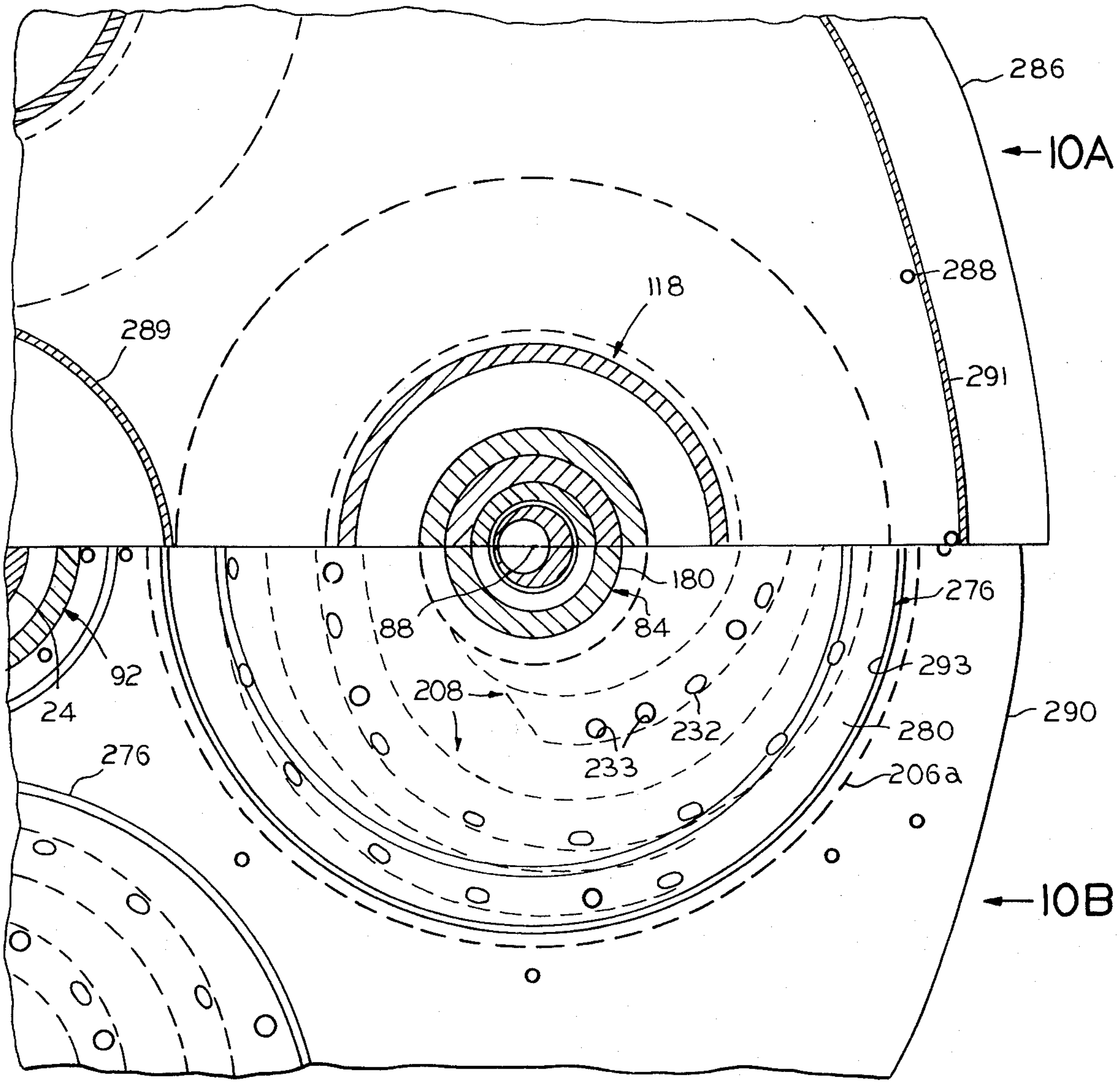
FIG. 10 is a sectional and top plan view of the apparatus illustrated in FIG. 9, on the same scale, the view being composed of two divided parts, taken substantially on line 10A—10A of FIG. 9 for one part of the view, identified as 10A, and taken substantially on lines 10B—10B of FIG. 9 for the remaining part of the view, identified as 10B.
Figure 9:
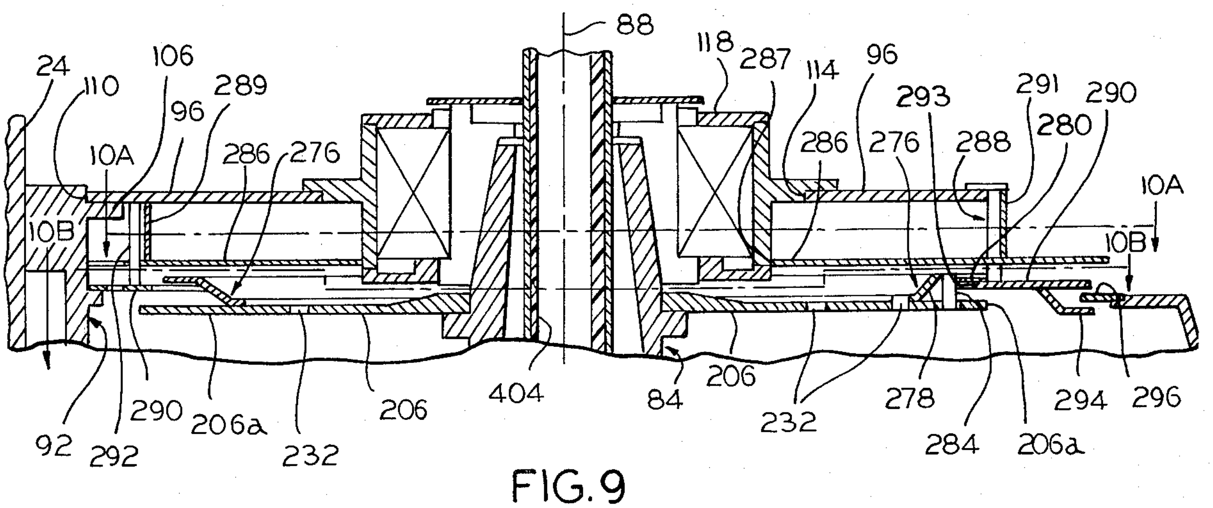
FIG. 9 is a fragmentary view of the apparatus as illustrated in FIG. 2, enlarged with respect thereto.

Referring to FIGS. 2, 9 and 10, an annular, piepan-shaped liquid flow guide 276 is secured to the roof plate 206 of each basket 86 therearound and rotates with the roof plate. The flow guide 276 includes an upwardly and outwardly inclined wall 278 and a horizontal upper rim 280. The flow guide 276 encloses the liquid discharge openings 232 and 233 in the roof plate 206 and tubular fittings 284 (FIG. 9) mounted in some of them, for collecting and directing the flow of liquid discharged from the basket 86 at the top thereof.

An annular horizontal cover plate 286 receives the upper basket shaft bearing assemblies 118 in openings 287 therein, and is supported over the baskets 86, by first hangers 288 depending from the outer margin of the upper basket mounting member 96. The cover plate 286 covers the flow guides 276 of the baskets 86 and extends radially outwardly there beyond, for directing liquid flow. Inner and outer circular bands 289 and 291, respectively, extend vertically between the basket mounting member 96 and the cover plate 286, for the prevention of turbulence therebetween.

A horizontal pan 290 surrounds the drive shaft 24 and is supported from the mounting member 96 in vertically spaced relation below the cover plate 286, by the first hangers 288 and also by second hangers 292 at the inner margin of the mounting member 96. The pan 290 is provided with a circular opening 293 for each basket 86, which has a diameter slightly greater than that of the upper rim 280 of the flow guide 276 on the roof plate 206. The pan 290 is mounted a short distance below the upper rim 280, and above the roof plate 206. The pan 290 extends over the rim 206*a* of the roof plate therearound, thereby to form a labyrinth-like arrangement of the flow guide rim 280, the pan 290 around its opening 293, and the roof plate rim 206*a*.

A channel-forming member 294, generally L-shaped in cross section, depends from the pan 290 around its outer periphery. An inwardly projecting horizontal flat ring 296 on the upper apron 54 extends into the channel formed by the pan 290 and the member 294 depending therefrom, to form a labyrinth-like arrangement of such parts. The pan 290 and its dependent member 294 rotate with he upper mounting member 96 around the axis 64 of the drive shaft 24, while the flow guides 276 rotate with the mounting member 96 and also rotate about the basket axes 88. The apron 54 remains stationary. The described structure and arrangement thereof serve to convey liquid filtrate discharged from the baskets 86 through the liquid discharge openings 232 and 233, to the trough 56, for discharge through the drain pipe 58. Backflow of liquid discharge is minimized by the described labyrinth-like arrangements.

Referring to FIGS. 1–4, solids of low liquid content are discharged at the radially outer ends of the vanes 210 in each basket 86, being impelled towards the outer periphery of the lower mounting members 94, and into the bin 62 therearound where they are collected. The solids may be removed in any desired manner. In the illustrative embodiment, as shown in FIG. 1, a plow wheel 298 is mounted in the housing 22 for rotation about the lower gear box 148, by means not shown. The wheel includes a vertical cylindrical wall 300 and a horizontal annular rim flange 302 on top of the wall. The wall 300 extends between the side wall 176 of the upper gear box 164, and an inner side wall 304 of the lower apron 60. The rim flange 302 extends between the lower mounting member 94 and the upper edge of the apron side wall 304. An annular plate 306 is secured to the rim flange 302 and depends therefrom into the bin 62. Plow blades 308 are mounted on the plate 306 at intervals therearound. Upon rotation of the wheel 298, by suitable means, not shown, the blades 308 scrape the solids in the bin to a discharge outlet, also not shown, for removal from the housing 22.

In the operation of the separator 26, with the drive shaft 24 driven by the motor 80, slurry is supplied to the reservoir 178 in each basket shaft 84. The slurry collects on the side wall 180 of each shaft under centrifugal force, until discharged from an outlet 194. Which outlet serves to discharge slurry is determined by the rotational position of the basket shaft 84 about its axis 88. Referring to FIG. 4, discharge is from the outlet 194 most remote from the axis 64 of the drive shaft 24, which is the axis of high speed rotation. The slurry discharged from such outlet impinges on the impact member 214 facing the outlet, and may impinge also on the adjacent portion of the screen member 216 of the vane 210 in the same assembly 208. The volume of the slurry space in the basket 86 is a maximum at the leading end of each screen member 216, adjacent to the impact member 214, and the space between two successive vanes 210 is greatest at the leading end of the second in succession, to accommodate the volume of slurry introduced while enabling the slurry to move and be filtered. Liquid from the slurry passes through each screen member 216 and is discharged at the top of each vane assembly 208, through the discharge openings 232 and 233. A large portion of the liquid is removed in this area, to reduce the slurry volume considerably.

As each basket shaft 84 and the basket 86 thereon rotate slowly about their axis 88, while the entire separator 26 rotates at high speed about the drive shaft axis 64, the slurry moves under the forces to which it is subjected, along each vane 210. The slurry tends to concentrate where the centrifugal force is greatest. In FIG. 4, the arrow F represents a centrifugal force vector through the center of the discharge outlet 194 most remote from the drive shaft axis 64. Both the basket 86 and the separator 26 rotate in the counterclockwise direction in FIG. 4, about the respective axes 88 and 64, as indicated respectively by the arrows r and R. The slurry moves along each vane 210 in the direction of increasing radius from the drive shaft axis 64, i.e., from the leading end of the vane to the trailing end thereof. Several locations of the slurry during such travel are schematically illustrated at Sa, Sb and Sc in relationship to respective vane assemblies **208*a*, 208*b*, and 208*c*.**

Liquid continues to pass through the screen member 216 as the slurry travels along each vane 210, under increasing centrifugal force as the liquid content decreases. Ultimately, product solids having low liquid content are impelled to the trailing end of each vane. There, the solids are discharged from the surface of the vane screen member 216, by the resultant force acting thereon, the discharge being indicated by an arrow at the trailing end of the vane assembly **208*a* in FIG. 4. Discharge of solids takes place successively from the vane assemblies 208*a*, 208*c* and 208*b*, and the solids are collected in the bin 62**, as described above.

The basket structure of the present invention thus utilizes the entire filtering capacity of the vane assemblies 208, commencing at the leading end of each screen member 216, adjacent to the impact member 214, and continuing to the trailing end of the screen member. The reservoir 178 provided by the basket shaft 84, and the discharge outlets 194 serve to confine the feed slurry and direct it to the leading ends of the vane assemblies. On the other hand, the screen area in the basket structure in U.S. Pat. No. 3,402,821 is not fully utilized by all of the slurry supplied to the basket. This deficiency is attributed to the absence of confinement of the feed slurry and of directional discharge, such as provided by the present invention. The shortcomings of the prior structure result in lower operating efficiency and capacity, and may result in disproportionate wear of the screen elements towards their trailing ends.

While provision may be made for filtered liquid discharge at the bottom of the baskets 86, in a manner such as disclosed in U.S. Pat. No. 3,402,821, a feature of the present invention is the structure providing for discharge at the top of the baskets. The liquid separated from the slurry in the separator more readily is kept separate from the solids product. Also, the liquid collection and removal system handles the liquid discharge from both the separator 26 and the concentrator 28, so that no additional provision need be made for the concentrator discharge.

Further advantages over the separator of U.S. Pat. No. 3,402,821 include additional strength provided by the basket-mounting shafts 84 and also by the mounting of the drive shaft 24.

Referring to FIGS. 1, 2, and 11–13, the concentrator 28 is mounted on the upper section of the drive shaft 24 for rotation therewith. The concentrator 28 includes a mounting sleeve 310 mounted on the drive shaft 24, an annular base plate 312 mounted on the mounting sleeve, a feed slurry reservoir 314 mounted on the base plate, four like vane assemblies 316 mounted on the base plate, and an annular cover plate 318 mounted on the vane assemblies in parallel relation to the base plate.

The mounting sleeve 310 is fixedly mounted on the drive shaft 24 therearound, above the carrier sleeve 92. The concentrator base plate 312 is fixedly mounted at its central region on and normal to the mounting sleeve 310, and is supported at its periphery by support brackets 320 extending between it and each of the bearing boxes 174. A circular central opening 322 in the cover plate 318 is bounded by a depending flange 324, which forms an annular slurry input port 326 around the mounting sleeve 310. The slurry-contacting surfaces of the concentrator base and cover plates preferably are coated or covered with abrasion-resistant coatings 328 and 330 of material which possesses some resiliency. Suitable materials include polyurethanes and ultra-high molecular weight polyethylene.

Figure 11:
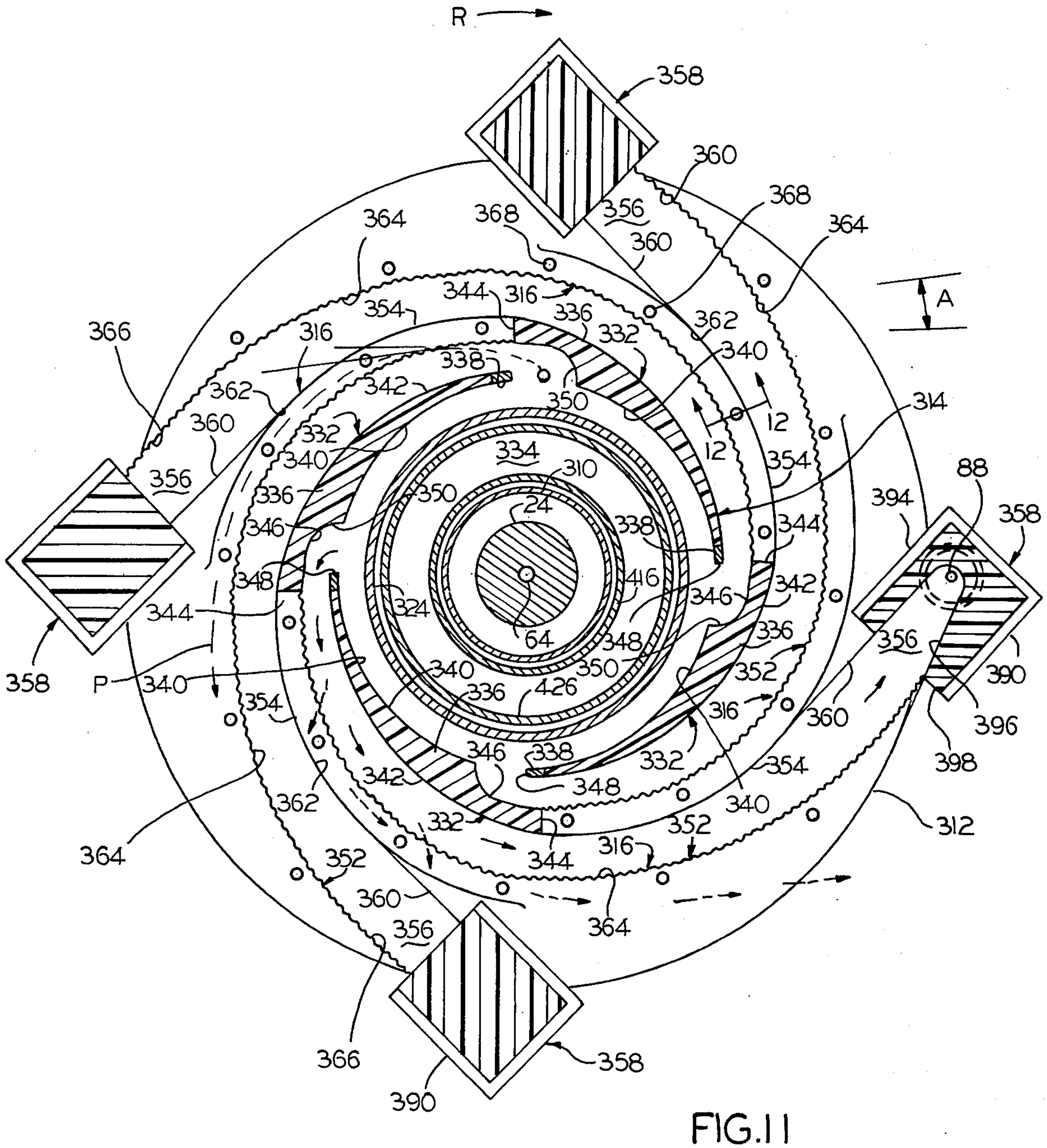
FIG. 11 is a horizontal sectional and partly schematic view of the apparatus, showing the concentrator, taken substantially on lines 11—11 of FIG. 1, with the relationship of the parts shown substantially to scale.

As is best seen in FIG. 11, the feed slurry reservoir 314 is mounted centrally on the concentrator base plate 312 for rotation therewith. The reservoir 314 is formed between the base and cover plates 312 and 318, by four identical imperforate arcuate wall members 332 secured to the base plate and extending vertically to the cover plate, and encompassing an annular central portion 334 of the base plate 312. The wall members 332 in the illustrative embodiment are formed of solid blocks of impact and abrasion-resistant material, which may be tipped with still harder, more wear-resistant material. Thus, for example, the main body 336 of each wall member 332 may be constructed of a polyurethane, while the tip 338 at the leading end thereof may be constructed of a metallic carbide.

Each wall member 332 has a radially inner surface 340 that is cylindrically curved coaxially with the drive shaft axis 64, which is the axis of rotation of the concentrator. Each wall member 332 has a radially outer surface 342 that is spirally curved from the tip 338 to the trailing end 344 of the member. The several wall members 332 each extend angularly around the axis 64 for slightly more than 90°, so that they slightly overlap each other. A pocket 346 having a curved surface is formed at the trailing end 344 of each wall member 332, as a recess in the inner surface 340, whereby adjacent ends of the wall members are spaced apart from each other, with each portions spaced apart angularly and/or radially. The structure thereby forms a restrictive reservoir discharge outlet 348 at the perimeter of the reservoir 314 for each pair of adjacent wall member ends. Each outlet 348 defines a rectangular discharge opening 350.

The vane assemblies 316 are secured to the base and cover plates 312 and 318 for rotation therewith. The vane assemblies 316 are spirally curved, and each vane assembly 316 includes a spirally-curved vane or vane proper 352 and a spaced parallel sprially-curved baffle 354, each of which extends radially outwardly from the trailing end 344 of a wall member 332. Each of the reservoir discharge outlets 348 is in fluid communication via a wall member pocket 346 with a vane 352 of one of the vane assemblies 316.

Each vane 352 extends to a concentrated slurry discharge point 356 adjacent to the outer periphery of the base plate 312, and to a discharge conduit 358 mounted on the base plate 312 at the discharge point. The radially outer end of each vane 352 overlaps the inner end of the next succeeding vane assembly 316. The baffle 354 parallel to the vane 352 of the latter vane assembly extends around the base plate 312 beyond the discharge point 356 for the overlapping vane, for reasons which will appear. In the illustrative embodiment, an auxiliary baffle 360 extends generally tangentially from the baffle 354 of each van assembly 316, to the discharge conduit 356 to which the vane 352 of the preceding vane assembly 316 extends.

Each vane assembly 316 defines with the base and cover plates 312 and 318 a liquid collection space 362 therein, which space extends with the baffle 354 beyond a discharge point 356. Each wall member 332 and the baffle 354 extending therefrom, and the vane 352 overlapping the same, define with the base and cover plates 312 and 318 an outwardly widening slurry passageway 364 of rectangular cross section. The passageway 364 terminates in a relatively straight run zone 366 of rectangular cross section, adjacent to a discharge conduit 358.

Figure 12:
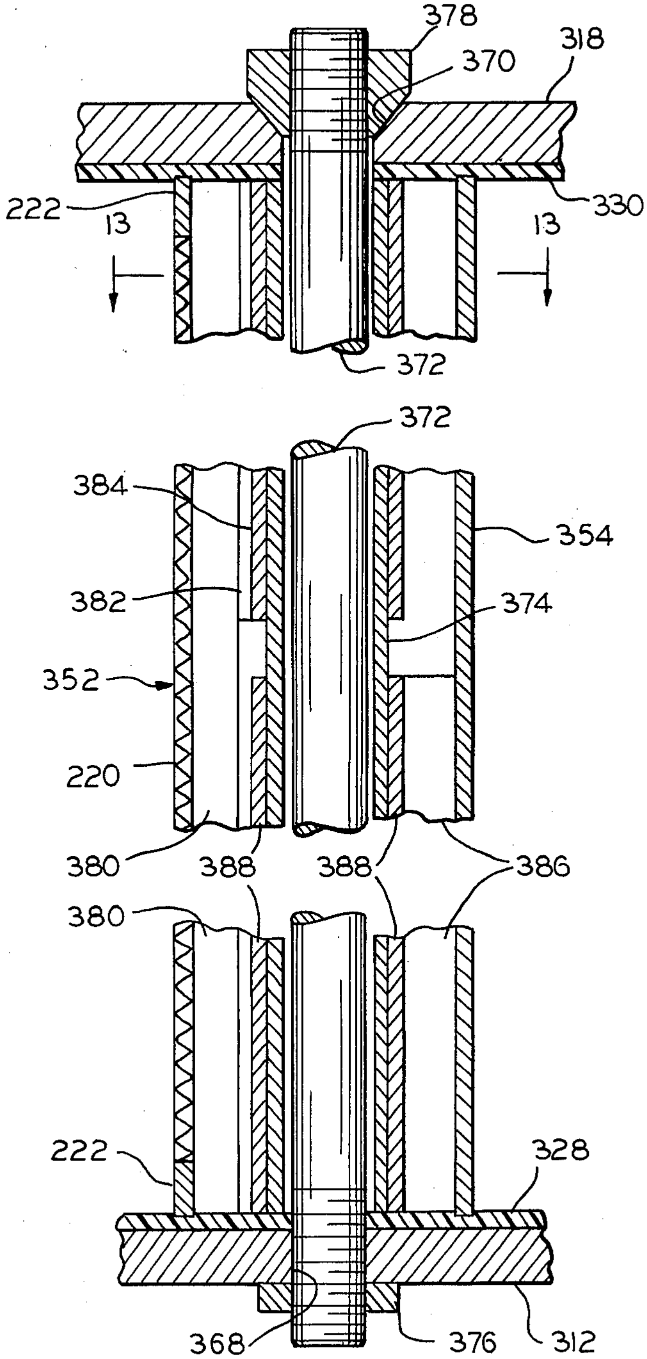
FIG. 12 is an enlarged vertical sectional view, with certain parts in elevation, of a vane assembly in the concentrator, taken substantially on line 12—12 of FIG. 11.
Figure 13:
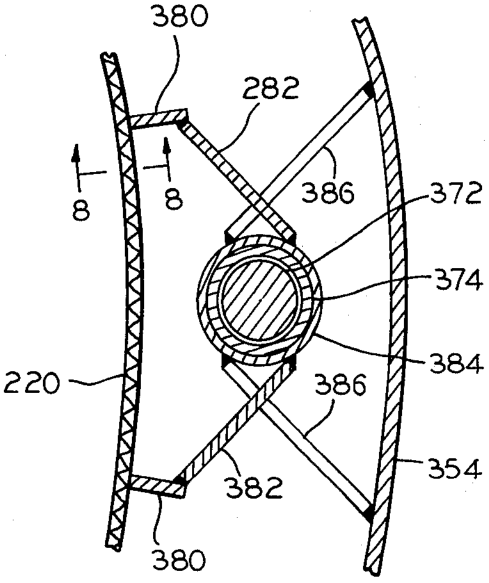
FIG. 13 is a fragmentary horizontal sectional view of the structure of FIG. 12, taken substantially on line 13—13 thereof.

Referring to FIGS. 11–13, mounting holes 368 and 370 are provided in the concentrator base and cover plates 312 and 318, respectively, in opposed relation, with the holes in each plate spaced apart along spiral curves situated between the vanes 352 and the baffles 354 of respective vane assemblies 316 and having substantially the same curvature as the vane assemblies. A mounting bolt 372 extends between the base and cover plates 312 and 318, and through each pair of opposed mounting holes 368 and 370. A spacer tube 374 fits slidably over each bolt 372 and extends between the base and cover plates 312 and 318. Each bolt 372 is secured by lower and upper nuts 376 and 378, respectively, removably securing the cover plate 318 to the base plate 312.

The vanes 352 in the concentrator vane assemblies 316 of the illustrative preferred embodiment are constructed like the above-described filter screen members 216 of the separator vanes 210 (FIGS. 6 and 8), each including a screen element 220 bounded by rigid strips 222 secured along its upper and lower edges. Generally parallel, laterally spaced apart mounting bars 380 are fixed to the radially outer surface of each vane 352 and extend vertically substantially for the height thereof. The bars 380 in each pair of adjacent bars are welded or otherwise fixed to respective webs 382 in a pair of laterally extending convergent vane-mounting webs. The webs 382 in each pair in turn are welded or otherwise fixed to a vertically extending vane-mounting sleeve or tube 384, which extends downwardly from the upper edge of the vane 352, for approximately one-half of the vane height. Each sleeve 384 is removably mounted around the spacer tube 374 on one of the mounting bolts 372, the upper portions of which tube and bolt extend through the sleeve.

The vane assembly baffles 354 and the auxiliary baffles 360 are constructed of sheet metal, such as stainless steel, or other suitable sheet material. Laterally extending webs 386 in pairs of convergent webs are welded or otherwise fixed at one end to the radially inner wall surface of each vane assembly baffle 354. The opposite ends of the webs 386 in each pair are fixed to a vertically extending baffle-mounting sleeve or tube 388. The sleeve 388 extends upwardly from the lower edge of the baffle 354, for approximately one-half of the baffle height. Each baffle-mounting sleeve 388 is removably mounted around a spacer tube 374 on one of the mounting bolts 372, below a vane-mounting sleeve 384, with the lower portions of the tube and the bolt extending through the baffle-mounting sleeve.

The foregoing structure provides for convenient removal of the cover plate 318, followed by removal of one or more vanes 352, whenever vane removal is necessary or desirable, for repair or replacement. Thus, it is necessary only to remove the upper nuts 378 on the mounting bolts 372, lift the cover plate off of the bolts, and lift a vane or vanes 352 to cause the mounting sleeves 384 thereof to slide off of the corresponding spacer tubes 374, while the bolts 372 are prevented from falling through the holes 368 in the base plate 312. The structure is reassembled by reversing the procedure.

In the operation of the concentrator 28, with the drive shaft 24 driven by the motor 80, slurry is supplied to the concentrator reservoir 314, where the slurry is accelerated radially outwardly. The wall members 332 impede outward movement of the slurry, which is contained under centrifugal force. The slurry is channeled outwardly from the reservoir 314 through the four restrictive discharge outlets 348. At each outlet 348, the slurry forms a stream commencing in the pocket 346 thereat and continuing in the adjoining slurry passageway 364. Each slurry stream flows between a vane 352 and, successively, a wall member 332, a vane assembly baffle 354, and an auxiliary baffle 360. The general flow path of one of the slurry streams in a passageway 364 is indicated by full-line arrows in FIG. 11.

As a slurry stream flows past a vane 352, a portion of its liquid passes through the screen element 220 thereof, along a vane, as indicated by broken-line arrows in FIG. 11, and is collected as filtrate and flows outwardly in the collection space 362, to the trailing end of the vane baffle 354. The vane baffle 354 prevents filtrate from mixing with the concentrate obtained from the stream flowing along the overlapping vane 352. The auxiliary baffle 360 also prevents such mixing and, further, serves to confine the concentrate in each stream. The liquid exiting at the radially outer or trailing end of each baffle 354 is discharged over the base plate 312, and from there through the adjacent space in the housing 22 to the trough 56, for removal through the drain conduit 58, along with the liquid discharged from the separator 26. The remainder of the slurry stream, concentrated by the removal of liquid, flows in the passageway 364 bordered by the vane, to the discharge point 356 and the discharge conduit 358 thereat.

The slurry stream formed at the reservoir discharge outlets 348 nominally follow spiral flow paths commencing at respective outlets and continuing radially outwardly therefrom over the base plate, in accordance with the laws of physics. Such flow paths may be determined experimentally, in the absence of the vane assemblies 316. The mean curve or center line P of such a flow path is represented by a broken line, in FIG. 11, for purposes of illustration. The vanes 352 preferably conform generally to the experimentally observed mean curvature of the flow paths, such as the curvature of the curve P.

The vanes 352 are oriented on the base plate 312 so as to intersect respective streams following such flow paths, in each case at an acute angle to the direction of flow, as represented by the means curve of each stream. Such intersection of one vane 352 and the stream having the mean curve P is illustrated in FIG. 11. The angle of intersection, measured as the angle between the tangents to the curve of the vane and the curve P at the point of intersection, is identified as A in FIG. 11. The specific angle of intersection is determined empirically, by adjustment of the vane thereby to adjust the angle, so as to remove a desirable fraction of the liquid in the slurry stream, by filtration through the vane therealong while the remainder of the stream travels along the vane to the discharge point 356, with accompanying conditions and results being satisfactory.

The amount of liquid removed is limited to an amount which maintains the slurry form of the material and permits it to flow from each vane. Also, it is desirable that the angle of intersection be such that the vane does not become clogged with slurry solids under the operating conditions, but the vane is continuously washed with slurry. Another factor taken into consideration is the amount of abrasion of the vane which is experienced at various angles of intersection under the operating conditions. Further, passage of fine particles through the vane may be minimized, to minimize loss of solids and solids contamination of the effluent liquid. Generally speaking, the amount of liquid removed, the tendency to clog the vane, the passage of fine particles through the vane, and abrasive wear will increase with increasing magnitude of the angle of intersection, and vice versa.

As an example of a concentrator design and operation in accordance with the foregoing description, the concentrator 28 is illustrated in FIG. 11 with the dimensions, configurations and dispositions of the slurry feed reservoir 314, the discharge outlets 348, and the vane assemblies 316 drawn substantially to scale for one embodiment. In such embodiment, the radial distance between the drive shaft axis 64 and the axis 88 of each basket shaft 84 was 32 inches. The triangular wires 224 in the screen element 220 were 1/16-inch wide on a side, and the spacing between the bases 228 of adjacent wires was 0.006 inch. The vertical spacing between the base and cover plates 312 and 318 was 5 inches, and the vertical height of the screen element 220 was 4 inches.

A slurry of ground coal was prepared by mixing, in parts by weight, 30 parts of coal and 70 parts of water, representing a slurry solids content of 30%. All of the coal passed through a 50 mesh screen (Tyler standard), and 28% by weight passed through a 325 mesh screen. The shaft 24 of the foregoing concentrator embodiment was rotated at 425 RPM, and the slurry was supplied to the reservoir 314 at a rate of 200 gallons per minute. The solids content of the concentrate delivered to the discharge point 356 was about 52% by weight. Slurry of such composition may be further concentrated in the separator 26 to a solids product having on the order of 8% by weight moisture content.

Referring to FIGS. 1, 2, and 11, each discharge conduit 358 includes a transition elbow fitting 390 and a vertically extending cylindrical tube or pipe 392. The fitting 390 includes a connecting flange 394, which projects laterally around its base from three of its sides. Preferably, the fitting 390 is a one-piece cast body of wear-resistant material. The fitting 390 is provided with a passageway 396 therein, which extends with a 90-degree change in direction from a side face 398 (FIG. 11) to a bottom face 400 (FIG. 2). The passageway 396 changes in cross-sectional configuration from rectangular, at its side face 398, to circular, at its bottom face 400, accompanied by a reduction in cross-sectional area from the side face to the bottom face.

The tube 392 is provided with a connecting flange plate 402, which is secured to its upper end therearound. The tube 392 and the flange plate 402 preferably are provided with a coat or layer 404 of wear-resistant material, which is present on the upper surface of the plate and the inner surface of the tube, further preferably being thicker on the far side of the latter surface, with respect to the direction of slurry flow into the conduit 358, as disposed in use. The inside diameter of the coated tube 392 is substantially the same as the inside diameter of the circular end of the passageway 396 in the fitting 300.

Each fitting 390 is connected at its side face 398 to the concentrator base and cover plates 312 and 318, a vane 352, and an auxiliary baffle 360, with the slurry and fitting passageways 364 and 396 in alignment. The fitting 390 may be secured by bolts inserted through flanges 406 and 408 on the base and cover plates, respectively, and through flanges or the like (not shown) on the vane and baffle, and into the fitting, or by other suitable means. Each fitting 390 is connected at its bottom face 400 to a tube 392, with their respective passageways in alignment. The fitting and the tube may be secured together by bolts (not shown) inserted through the flange 394 and the flange plate 402 thereof. The tube 392 is inserted freely through the successive openings 176, 192, and 190 in the bearing box 174, holder 122, and basket shaft 84, respectively, associated with a filter basket 86, to about one-half of the depth of the reservoir cavity 188 in the shaft. The axis 88 of the basket shaft 84 and the axis of the tube 392 coincide.

The concentrated slurry or concentrated obtained in the concentrator 28 flows in the slurry passageways 364 thereof to the fittings 390 of the discharge conduits 358. The concentrate streams are conducted by the several conduits 358 to respective reservoirs 178 in the separator 26, as feed slurry thereto, for further removal of liquid to produce solids of low liquid content, in the manner described above.

Referring to FIGS. 1 and 2, the slurry feed assembly 30 is centrally mounted on the roof 38 of the housing 22. The feed assembly 30 includes two slurry input pipes 412 mounted on top of the roof 38, and an annular supply reservoir 414 mounted on and depending from the roof. The pipes 412 are disposed on opposite sides of the upper drive shaft bearing assembly 68. The pipes 412 are flanged, for connection to other pipes or conduits, not shown, leading from a source of supply. The supply reservoir 414 surrounds the drive shaft 24, and the pipes 412 discharge into the reservoir, on opposite sides thereof.

The supply reservoir 414 includes a cylindrical inner wall 416 and, coaxial therewith, a stepped outer wall 418. The outer wall 418 includes three sections: a cylindrical upper section 420, a cylindrical lower section 422 of reduced diameter, and a flat annular horizontal connecting section 424 extending therebetween. The inner wall 416 and the lower section 422 of the outer wall 418 together form an annular feed outlet 426, which is disposed below the input port 326 of the concentrator 28 and in the feed slurry reservoir 314 thereof. The supply reservoir 414 serves to assist in distributing slurry evenly in the concentrator reservoir 314, and at a substantially constant flow rate.

In the operation of the apparatus 20, the main drive shaft 24 is rotated at a relatively high speed, typically at about 400 to 1200 revolutions per minute (RPM), thereby conjointly rotating the concentrator 28 and the separator 26 at the same speed. Slurry from an external source, e.g., a coal slurry pipeline, is introduced into the apparatus 20 through the input pipes 412, for separation of liquid and solid components of the slurry. While water is the most common liquid component of the slurry, it will be understood that the invention is useful as well as for the separation of other liquids and of liquid mixtures from solids contained in liquid-solid slurries.

As the basket shafts 84 and the baskets 86 thereon rotate at high speed about the axis 64 of the drive shaft 24, they also rotate about their own axes 88 at a slow speed, as described above, typically at about 1–20 RPM. The latter rate of rotation is determined by the selected speed of rotation of the drive shaft 24 and the gear ratios employed in the gear train from the spur gear 126 to the planet gear 140.

The separator of the invention, represented by the embodiment 26, and may be employed in other ways and in other combinations. For example, the separator may be employed with a spider-type feed assembly, such as disclosed in the above-identified U.S. Pat. No. 3,402,821, in place of the concentrator 28 employed in the improved combination of the present invention. However, in addition to the increased solids throughout achieved by employing the concentrator 28 with the separator 26, the concentrator acts to prevent clogging in the supply paths to the separator, as compared to the spider-type feed assembly.

Figure 14:
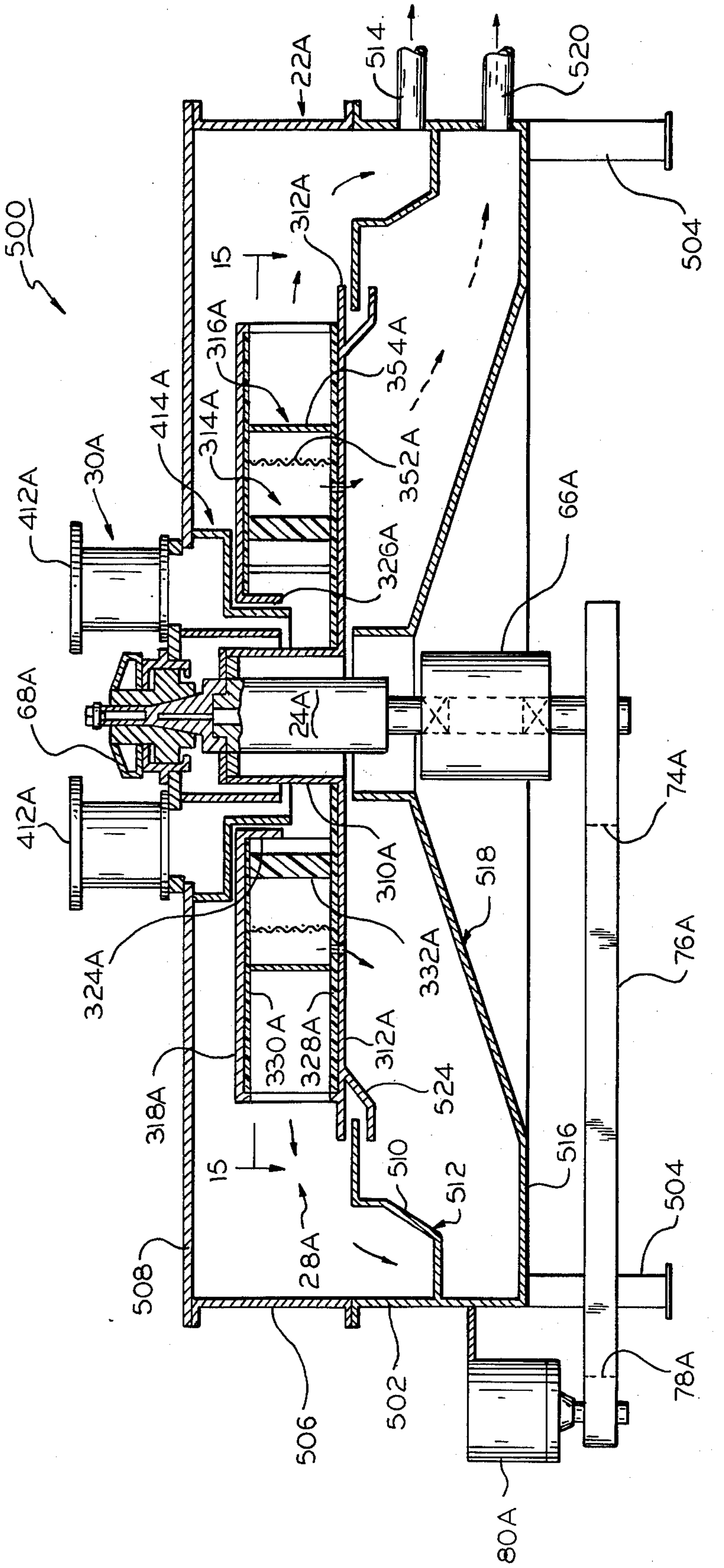
FIG. 14 is a vertical sectional view taken generally centrally, with certain parts shown schematically, of another embodiment of apparatus according to the invention.
Figure 15:
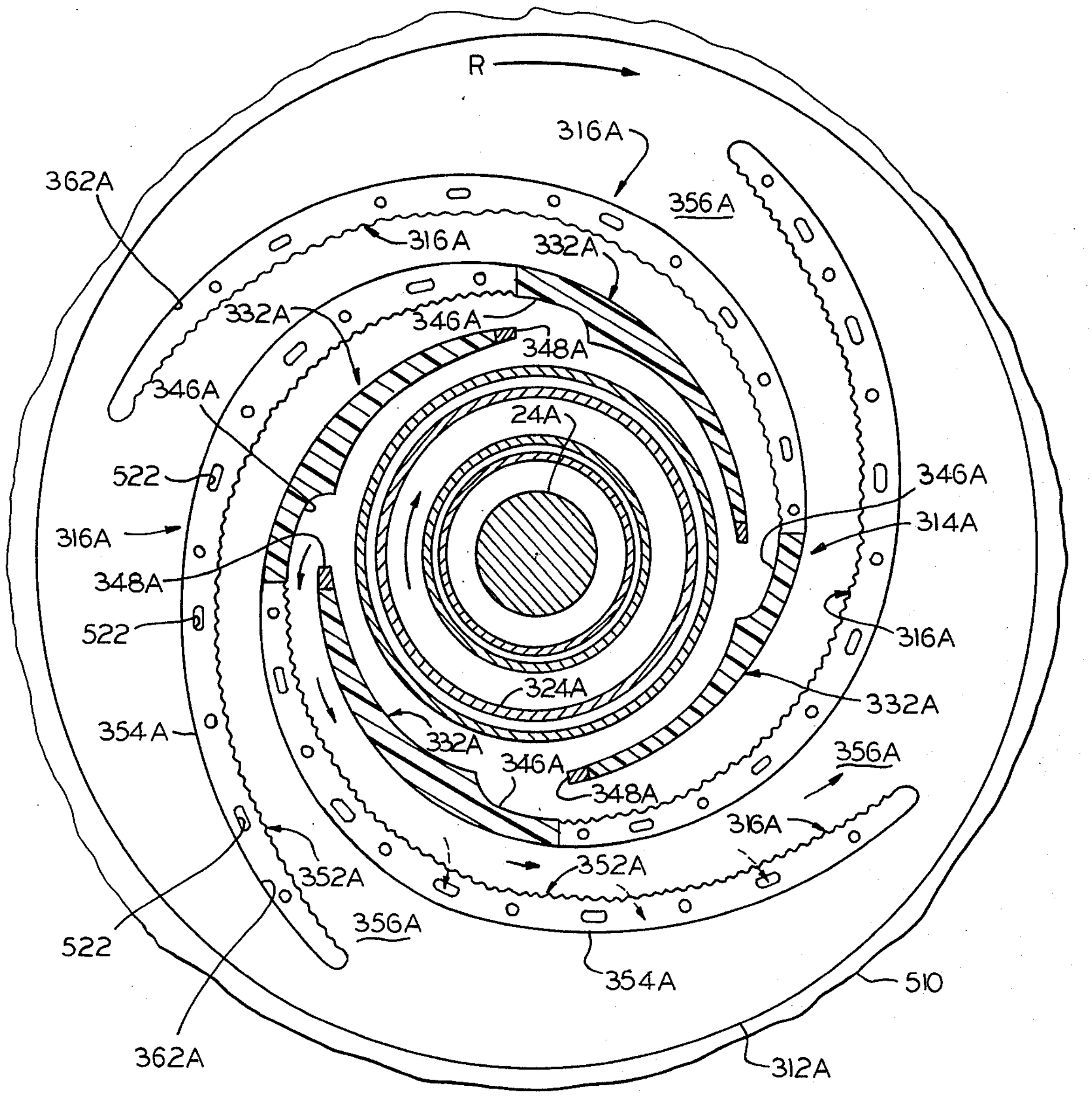
FIG. 15 is an enlarged horizontal sectional and partly schematic view of the concentrator of the embodiment of FIG. 14, taken substantially on line 15—15 thereof.

The concentrator of the invention may be employed for supplying concentrate to other separators, for example, a so-called solid bowl centrifuge. Alternatively, the concentration achieved in the concentrator may suffice for the intended use or disposition of the material. FIGS. 14 and 15 illustrate apparatus 500 which constitutes another embodiment of the invention and which is constructed to discharge concentrate for use in a desired manner or for further concentration in separation equipment. The compact nature of the apparatus 500 enables it to be used conveniently in various locations, either alone or in combination with other liquid separation apparatus.

The structure and operation of the apparatus 500 are basically the same as the structure for producing concentrate in the above-described first apparatus embodiment 20 and the operation thereof. Accordingly, in the interest of brevity, the parts of the apparatus 500 are identified by the reference numerals applied to the same or similar parts of the first apparatus embodiment 20, with the addition of the letter "A" thereto, and additional structure is identified by additional reference numerals.

Referring to FIG. 14, the apparatus 500 includes a stationary housing 22A, a drive shaft 24A, a centrifugal concentrator 28A mounted on the drive shaft and driven thereby at a high rate of rotation, and a slurry feed assembly 30A mounted on the housing. Raw slurry from a source of supply is supplied to the feed assembly 30A, which discharges the slurry into the concentrator 28A. A portion of the liquid is removed from the slurry in the concentrator by filtration, to produce a concentrated slurry. The concentrate is discharged from the apparatus 500 and may be conducted to any desired destination.

The housing 22A is constructed of a cylindrical lower casing 502 supported by legs 504, a cylindrical upper casing 506, and a roof 508. An upper apron 510 is mounted on the inner surface of the lower casing 502 therearound, to form with the casing an annular concentrate-collecting trough 512. A slurry drain pipe or conduit 514 is mounted in a corresponding opening in the lower casing 502, in communication with the interior of the trough 512. A lower apron 516 is mounted on the inner surface of the lower casing 502 therearound, to form with the casing an annular liquid-collecting tank 518. A liquid drain pipe 520 is mounted in a corresponding opening in the lower casing 502, in communication with the interior of the tank 518.

The drive shaft 24A is supported at its opposite ends for rotation about its longitudinal axis by lower and upper conventional bearing assemblies 66A and 68A, respectively. A drive motor 80A is coupled to the drive shaft 24A by sheaves 74A and 78A having a drive belt 76A trained thereon.

Referring to FIGS. 14 and 15, the concentrator 28A is mounted on the drive shaft 24A for rotation therewith. The concentrator 28A includes a mounting sleeve 310A mounted on the drive shaft 24A, an annular base plate 312A mounted on the mounting sleeve, a feed slurry reservoir 314A mounted on the base plate, four like vane assemblies 316A mounted on the base plate, and an annular cover plate 318A mounted on the vane assemblies in parallel relation to the base plate. An annular flange 324A depends from the cover plate 318A and forms an annular slurry input port 326A around the mounting sleeve 310A. The slurry-contacting surfaces of the base and cover plates 312A and 318A are coated with abrasion-resistant coatings 328A and 330A, respectively.

As in the first concentrator embodiment 28, the feed slurry reservoir 314A in the second embodiment 28A is mounted centrally on the concentrator base plate 312A for rotation therewith, and is formed by four identical imperforate arcuate wall members 332A. The vane assemblies 316A are secured to the base and cover plates 312A and 318A for rotation therewith. Each vane assembly includes a spirally-curved vane or vane proper 352A and a spaced parallel spirally-curved baffle 354A, each of which extends radially outwardly from the trailing end of a wall member 332A. The wall members 332A from four reservoir discharge outlets 348A between them, and each outlet is in fluid communication with a vane 352A via a wall member pocket 346A.

Except for the structure for discharging the concentrate and the separated liquid, the second concentrator embodiment 28A is constructed and operates like the first embodiment 28. Thus, the concentrator vane assemblies 316A are constructed and function like the concentrator vane assemblies 316 of the first embodiment, except for changes relating to the discharge of concentrate and liquid. Each vane 352A extends to a concentrated slurry discharge point 356A adjacent to the outer periphery of the base plate 312A, as in the first embodiment. However, the concentrate is discharged over the edge of the base plate 312A in the second embodiment, and over the upper apron 510, for collection in the trough 512 and removal therefrom through the slurry drain pipe 514, whereas it is conducted to the discharge conduit 358 in the first embodiment.

The space between the vane 352A and the baffle 354A at the outer end of each vane assembly 316A is closed, thereby providing a closed liquid collection space 362A. A series of spaced apart discharge openings 522 is provided in the base plate 312A between the fane 352A and the baffle 354A of each vane assembly 316A. The discharge openings 522 communicate with the collection tank 518 therebeneath. Liquid filtered through the vanes 352A and collected in the space 362A drains through the discharge openings 522 into the tank 512 and is removed from the tank through the liquid drain pipe 520.

An annular channel-forming member 524, generally L-shaped in cross section, depends from the base plate 312A around its outer periphery. The outer marginal portion of the base plate 312A and the channel-forming member 524 form a labyrinth-like arrangement with the inner marginal portion of the upper apron 510 around the concentrator 28A, for prevention of backflow of concentrate therefrom.

The slurry feed assembly 30A includes two slurry input pipes 412A, which conduct feed slurry to an annular supply reservoir 414A. The supply reservoir 414A is constructed like the reservoir 414 of the first apparatus embodiment 20, and cooperated with the feed slurry reservoir 314A in like manner to the cooperation with such reservoir 314 in the first embodiment.

While preferred embodiments of the apparatus of the invention have been described and illustrated, it will be apparent to those skilled in the art that various changes and modifications may be made therein within the spirit and scope of the invention. It is intended that all such changes and modifications be included within the scope of the claims.

I claim:

1. Apparatus for separating liquid from solids contained in a liquid-solid slurry, which comprises, in combination, driven main shaft means, a centrifugal concentrator, a centrifugal separator, means mounting said concentrator and said separator, respectively, on said shaft means for conjoint rotation about the axis of the shaft means when driven, said concentrator comprising:

a concentrator base plate centrally mounted on said shaft means for rotation about said axis of the shaft means, a concentrator feed slurry reservoir centrally mounted on said base plate for rotation therewith, a restrictive reservoir discharge outlet at the perimeter of said reservoir, whereby feed slurry is discharged from the reservoir in a stream nominally to follow a spiral flow path commencing at said outlet and continuing radially therefrom over said base plate, upon rotation of the base plate about said axis to impart centrifugal force to the slurry, and a spirally curved perforate vane mounted on said base plate for rotation therewith and disposed to intersect said stream at an acute angle to the direction of flow, thereby to cause a fractional portion of the liquid in the slurry stream to pass through the vane therealong while the remainder of the stream travels along the vane to a radially outer concentrator discharge point, whereby the slurry is concentrated, said separator comprising:

a carrier centrally mounted on said shaft means for rotation about said axis of the shaft means conjointly with said concentrator base plate, a filter basket eccentrically mounted on said carrier for orbital movement about said shaft means axis and for rotation about a centrally disposed basket axis in spaced parallel relation to the shaft means axis, said filter basket including a base plate normal to and rotatable about said basket axis, and adapted to receive feed slurry on a central region thereof, said filter basket also including a spirally curved perforate vane mounted on said basket base plate for rotation therewith and extending radially outwardly from said central region, a separator feed slurry reservoir mounted in juxtaposition to said central region for rotation with said basket base plate, and a restrictive reservoir discharge outlet at the perimeter of said separator feed slurry reservoir and disposed adjacent to the radially inner end of said basket vane for supplying slurry to the vane adjacent to such end, whereby feed slurry supplied to said separator feed slurry reservoir is filtered by passage of liquid therefrom through said basket vane commencing adjacent to the inner end of the vane and continuing substantially for the full length of the vane, while solids therefrom are retained on the vane surface for discharge therefrom separately from the filtrate upon rotation of said carrier about said axis of the shaft means at a relatively high rate imparting centrifugal force to said slurry and rotation of said basket about the basket axis at a relatively low rate, and means for conducting said stream remainder from said concentrator discharge point to said separator feed slurry reservoir.

2. Apparatus as defined in claim 1, wherein said conducting means comprises a conduit, said separator feed slurry reservoir comprises a hollow shaft, and said discharge outlet of the latter reservoir comprising means providing a discharge opening in the wall of said shaft.

3. Apparatus for separating liquid from solids contained in a liquid-solid slurry, which comprises, in combination, driven main shaft means, a centrifugal concentrator, a centrifugal separator, means mounting said concentrator and said separator, respectively, on said shaft means for conjoint rotation about the axis of the shaft means when driven, said concentrator comprising:

a concentrator base plate centrally mounted on said shaft means for rotation about said axis of the shaft means, a concentrator feed slurry reservoir centrally mounted on said base plate for rotation therewith, a plurality of restrictive reservoir discharge coutlets in angularly saced apart relation around the perimeter of said reservoir, whereby feed slurry is discharged from the reservoir in streams nominally to follow spiral flow paths commencing at said outlets and continuing radially therefrom over said base plate, upon rotation of the base plate about said axis to impart centrifugal force to the slurry, and a plurality of spirally curved perforate vanes mounted on said base plate for rotation therewith and disposed to intersect respectively said streams at an acute angle to the direction of flow, thereby to cause a fractional portion of the liquid in each slurry stream to pass through its intersecting vane therealong while the remainder of the stream travels along the vane to a radially outer concentrator discharge point, whereby the slurry is concentrated, said separator comprising:

a carrier centrally mounted on said shaft means for rotation about said axis of the shaft means conjointly with said concentrator base plate, a plurality of filter baskets eccentrically mounted on said carrier for orbital movement about said shaft means axis and for rotation of each basket about a centrally disposed basket axis in spaced parallel relation to the shaft means axis, each of said filter baskets including a base plate normal to and rotatable about said basket axis, and adapted to receive feed slurry on a central region thereof, each of said filter baskets also including a plurality of spirally curved perforate vanes mounted on said basket base plate for rotation therewith and extending radially outwardly from said central region, a separator feed slurry reservoir comprising a hollow shaft mounted in juxtaposition to said central region of each basket base plate for rotation with the basket base plate; and means providing a plurality of discharge openings in the wall of each of said shafts, each opening being disposed adjacent to the radially inner end of one of said basket vanes for supplying slurry to the vane adjacent to such end, whereby feed slurry supplied to said separator feed slurry reservoirs is filtered by passage of liquid therefrom through said basket vanes commencing adjacent to the inner ends of the vanes and continuing substantially for the full length of the vanes, while solids therefrom are retained on the vane surfaces for discharge therefrom separately from the filtrate upon rotation of said carrier about said axis of the shaft means at a relatively high rate imparting centrifugal force to said slurry and rotation of each of said baskets about the basket axis at a relatively low rate, and a conduit for conducting each of said stream remainders from its said concentrator discharge point to one of said separator feed slurry reservoirs.

4. Apparatus as defined in claim 3, wherein an outer end portion of each of said concentrator vanes overlaps an inner end portion of the next succeeding vane, and including baffle means interposed between each of said vane inner end portions and said overlapping outer end portion of the preceding vane, to separate said liquid portion passing through the inner end portion from said stream remainder flowing along the outer end portion of the preceding vane; and wherein each of said basket vanes includes a wear-resistant impact member at the inner end of the vane and facing the discharge opening adjacent to such end for discharge of slurry from the opening directly against the member.

5. In combination with a centrifugal separator for separating liquid from solids contained in a liquid-solid slurry, said separator including a carrier rotatable about a centrally disposed carrier axis, and a filter basket eccentrically mounted on said carrier for orbital movement about said carrier axis and for rotation about a centrally disposed basket axis in spaced parallel relation to the carrier axis, said filter basket including a base plate normal to and rotatable about said basket axis, and adapted to receive feed slurry on a central region thereof, and a spirally curved perforate vane mounted on said base plate for rotation therewith and extending radially outwardly from said central region, whereby feed slurry supplied to said central region is filtered by passage of liquid therefrom through said vane while solids therefrom are retained on the vane surface for discharge therefrom separately from the filtrate upon rotation of said carrier about the carrier axis at a relatively high rate imparting centrifugal force to said slurry and rotation of said basket about the basket axis at a relatively low rate, a centrifugal concentrator which comprises:

a concentrator base plate normal to said carrier axis and mounted for rotation about the carrier axis disposed centrally thereof, a feed slurry reservoir centrally mounted on said concentrator base plate for rotation therewith, a restrictive reservoir discharge outlet at the perimeter of said reservoir, whereby feed slurry is discharged from the reservoir in a stream nominally to follow a spiral flow path commencing at said outlet and continuing radially outwardly therefrom over said concentrator base plate, upon rotation of the concentrator base plate about said carrier axis to impart centrifugal force to the slurry, and a spirally curved perforate vane mounted on said concentrator base plate for rotation therewith and disposed to intersect said stream at an acute angle to the direction of flow, thereby to cause a fractional portion of the liquid in the stream to pass through the vane therealong while the remainder of the stream travels along the vane to a radially outer concentrator discharge point, whereby the slurry is concentrated, and means for conducting said stream remainder from said concentrator discharge point to said central region of the filter basket base plate.

6. A combination as defined in claim 5 and including means mounting said carrier and said concentrator base plate for conjoint rotation said carrier axis.

7. A combination as defined in claim 6, wherein said separator further includes a separator feed slurry reservoir comprising a hollow shaft mounted in juxtaposition to said central region of the basket base plate for rotation with the basket base plate, said hollow shaft having formed in the wall thereof a discharge opening, said opening being disposed adjacent to the radially inner end of said basket vane; and wherein said conducting means comprises a conduit arranged to discharge into said hollow shaft.

8. In combination with a centrifugal separator for separating liquid from solids contained in a liquid-solid slurry, said separator including a carrier rotatable about a centrally disposed carrier axis, and a plurality of filter baskets eccentrically mounted on said carrier for orbital movement about said carrier axis and for rotation about centrally disposed basket axes in spaced parallel relation to the carrier axis, each of said filter baskets including a base plate normal to and rotatable about said basket axis, and adapted to receive feed slurry on a central region thereof, and a plurality of spirally curved perforate vanes mounted on said base plate for rotation therewith and extending radially outwardly from said central region, whereby feed slurry supplied to said central regions is filtered by passage of liquid therefrom through said vanes while solids therefrom are retained on the vane surfaces for discharge therefrom separately from the filtrate upon rotation of said carrier about the carrier axis at a relatively high rate imparting centrifugal force to said slurry and rotation of each of said baskets about the basket axis at a relatively low rate, a centrifugal concentrator which comprises:

a concentrator base plate normal to said carrier axis and mounted for rotation about the carrier axis disposed centrally thereof, a feed slurry reservoir centrally mounted on said concentrator base plate for rotation therewith, a plurality of restrictive reservoir discharge outlets in angularly spaced apart relation around the perimeter of said reservoir, whereby feed slurry is discharged from the reservoir in streams nominally to follow spiral flow paths commencing at said outlets and continuing radially outwardly therefrom over said concentrator base plate, upon rotation of the concentrator base plate about said carrier axis to impart centrifugal force to the slurry, and a plurality of spirally curved perforate vanes mounted on said concentrator base plate for rotation therewith and disposed to intersect respective said streams at an acute angle to the direction of flow, thereby to cause a fractional portion of the liquid in each slurry stream to pass through its intersecting vane therealong while the remainder of the stream travels along the vane to a radially outer concentrator discharge point, whereby the slurry is concentrated, and means for conducting each of said stream remainders from its said concentrator discharge point to said central region of one of said basket base plates.

9. A centrifugal concentrator for liquid-solid slurries, which comprises:

a base plate having a centrally disposed axis of rotation normal thereto, a feed slurry reservoir centrally mounted on said base plate for rotation therewith, a restrictive reservoir discharge outlet at the perimeter of said reservoir, whereby feed slurry is discharged from the reservoir in a stream nominally to follow a spiral flow path commencing at said outlet and continuing radially outwardly therefrom over said base plate, upon rotation of the base plate about said axis to impart centrifugal force to the slurry, and a spirally curved perforate vane mounted on said base plate for rotation therewith and disposed to intersect said stream at an acute angle to the direction of flow, thereby to cause a fractional portion of the liquid in the stream to pass through the vane therealong while the remainder of the stream travels along the vane to a radially outer discharge point, whereby the slurry is concentrated.

10. A centrifugal concentrator for liquid-solid slurries, which comprises:

a base plate having a centrally disposed axis of rotation normal thereto, a feed slurry reservoir centrally mounted on said base plate for rotation therewith, a plurality of restrictive reservoir discharge outlets in angularly spaced-apart relation around the perimeter of said reservoir, whereby feed slurry is discharged from the reservoir in streams nominally to follow spiral flow paths commencing respectively at said outlets and continuing radially outwardly therefrom over said base plate, upon rotation of the base plate about said axis to impart centrifugal force to the slurry, and a spirally curved perforate vane for each of said flows paths mounted on said base plate for rotation therewith and disposed to intersect the stream nominally following the path at an acute angle to the direction of flow, thereby to cause a fractional portion of the liquid in the stream to pass through the vane therealong while the remainder of the stream travels along the vane to a radially outer discharge point, whereby the slurry is concentrated.

11. A concentrator as defined in claim 10, wherein an outer end portion of each of said vanes overlaps an inner end portion of the next succeeding vane, and including baffle means interposed between each of said vane inner end portions and said overlapping outer end portion of the preceding vane, to separate said liquid portion passing through the inner end portion from said stream remainder flowing along the outer end portion of the preceding vane.

12. A concentrator as defined in claim 11, wherein each of said baffle means is spaced radially outwardly from an adjacent one of said vanes and extends in substantially parallel relation thereto, and including means providing liquid discharge openings in said base plate and disposed between each of said baffle means and the vane adjacent thereto.

13. A centrifugal concentrator as defined in claim 12, wherein said feed slurry reservoir comprises a series of wall members surrounding said central axis and having opposite ends spaced apart from the ends of adjacent member to form said discharge outlets.

14. The combination of a concentrator as defined in claim 12 and conduit means at each of said discharge points for receiving the stream remainder travelling thereto along a vane separately from the liquid portion passing through such vane, and for conducting the stream remainder from the discharge point.

15. In a centrifugal separator for separating liquid from solids contained in a liquid-solid slurry, said separator including a carrier rotatable about a centrally disposed carrier axis, and a filter basket eccentrically mounted on said carrier for orbital movement about said carrier axis and for rotation about a centrally disposed basket axis in spaced parallel relation to the carrier axis, said filter basket including a base plate normal to and rotatable about said basket axis, and adapted to receive feed slurry on a central region thereof, and a spirally curved perforate vane mounted on said base plate for rotation therewith and extending radially outwardly from said central region, whereby feed slurry supplied to said central region is filtered by passage of liquid therefrom through said vane while solids therefrom are retained on the vane surface for discharge therefrom separately from the filter upon rotation of said carrier about the carrier axis at a relatively high rate imparting centrifugal force to said slurry and rotation of said basket about the basket axis at a relatively low rate, the improvement comprising:

a feed slurry reservoir mounted in juxtaposition to said central region for rotation with said base plate, and a restrictive reservoir discharge outlet at the perimeter of said reservoir and disposed adjacent to the radially inner end of said vane for supplying slurry to the vane adjacent to such end, whereby filtration of the slurry commences adjacent to the inner end of the vane and continues substantially for the full length of the vane.

16. A separator as defined in claim 15 and wherein said vane includes a wear-resistant impact member at the inner end of the vane and facing said discharge outlet for discharge of slurry from the outlet directly against the member.

17. A separator as defined in claim 15, wherein said feed slurry reservoir comprises a hollow shaft, and said discharge outlet comprises means providing a discharge opening in the wall of said shaft.

18. In a centrifugal separator for separating liquid from solids contained in a liquid-solid slurry, said separator including a carrier rotatable about a centrally disposed carrier axis, and a filter basket eccentrically mounted on said carrier for orbital movement about said carrier axis and for rotation about a centrally disposed basket axis in spaced parallel relation to the carrier axis, said filter basket including a base plate normal to and rotatable about said basket axis, and adapted to receive feed slurry on a central region thereof, and a plurality of spirally curved perforate vanes mounted on said base plate for rotation therewith and extending radially outwardly from said central region, whereby feed slurry supplied to said central region is filtered by passage of liquid therefrom through said vanes while solids therefrom are retained on the vane surfaces for discharge therefrom separately from the filtrate upon rotation of said carrier about the carrier axis at a relatively high rate imparting centrifugal force to said slurry and rotation of said basket about the basket axis at a relatively low rate, the improvement comprising:

a feed slurry reservoir mounted in said central region for rotation with said base plate, and a plurality of restrictive reservoir discharge outlets in angularly spaced-apart relation around the perimeter of said reservoir, each outlet being disposed adjacent to the radially inner end of one of said vanes for supplying slurry to the vane adjacent to such end, whereby filtration of the slurry commences adajcent to the inner ends of the vanes and continues substantially for the full length of the vanes.

19. A separator as defined in claim 18 and wherein each of said vanes includes a wear-resistant impact member at the inner end of the vane and facing the discharge outlet adjacent to such end for discharge of slurry from the outlet directly against the member.

20. A separator as defined in claim 19, wherein said feed slurry reservoir comprises a hollow shaft, and said discharge outlets each comprise means providing a discharge opening in the wall of said shaft.

21. A basket assembly for a centrifugal separator for separating liquid from solids contained in a liquid-solids slurry, said separator including a carrier rotatable about a centrally disposed carrier axis, and a filter basket eccentrically mounted on said carrier for orbital movement about said carrier axis and for rotation about a centrally disposed basket axis in spaced parallel relation to the carrier axis, said basket assembly comprising, in combination:

a filter basket including a base plate normal to and rotatable about said basket axis, and adapted to receive feed slurry on a central region thereof, and a spirally curved perforate vane mounted on said base plate for rotation therewith and extending radially outwardly from said central region;

a feed slurry reservoir mounted in juxtaposition to said central region for rotation with said base plate; and a restrictive reservoir discharge outlet at the perimeter of said reservoir and disposed adjacent to the radially inner end of said vane for supplying slurry to the vane adjacent to such end, whereby feed slurry supplied to said reservoir is filtered by passage of liquid therefrom through said vane commencing adjacent to the inner end of the vane and continuing substantially for the full length of the vane, while solids therefrom are retained on the vane surface for discharge therefrom separately from the filtrate upon rotation of said carrier about the carrier axis at a relatively high rate imparting centrifugal force to said slurry and rotation of said basket about the basket axis at a relatively low rate.

22. A basket assembly as defined in claim 21 and including a wear-resistant impact member at the inner end of said vane and facing said discharge outlet for discharge of slurry from the outlet directly against the member.

23. A basket assembly as defined in claim 21 wherein said feed slurry reservoir comprises a hollow shaft, and said discharge outlet comprises means providing a discharge opening in the wall of said shaft.

24. A basket assembly as defined in claim 21 wherein said vane is curved substantially in accordance with the graph of FIG. 16.

25. A basket assembly for a centrifugal separator for separating liquid from solids contained in a liquid-solids slurry, said separator including a carrier rotatable about a centrally disposed carrier axis, and a filter basket eccentrically mounted on said carrier for orbital movement about said carrier axis and for rotation about a centrally disposed basket axis in spaced parallel relation to the carrier axis, said basket assembly comprising, in combination:

a filter basket including a base plate normal to and rotatable about said basket axis, and adapted to receive feed slurry on a central region thereof, and a plurality of spirally curved perforate vanes mounted on said base plate for rotation therewith and extending radially outwardly from said central region;

a feed slurry reservoir comprising a hollow shaft mounted in juxtaposition to said central region for rotation with said base plate; and means providing a plurality of discharge openings in the wall of said shaft, each opening being disposed adjacent to the radially inner end of one of said vanes for supplying slurry to the vane adjacent to such end, whereby feed slurry supplied to said reservoir is filtered by passage of liquid therefrom through said vanes commencing adjacent to the inner ends of the vanes and continuing substantially for the full length of the vanes, while solids therefrom are retained on the vane surfaces for discharge therefrom separately from the filtrate upon rotation of said carrier about the carrier axis at a relatively high rate imparting centrifugal force to said slurry and rotation of each of said baskets about the basket axis at a relatively low rate.

26. A basket assembly as defined in claim 25 and including a wear-resistant impact member at the inner end of each of said vanes and facing the discharge opening adjacent to such end for discharge of slurry from the opening directly against the member.

27. A basket assembly as defined in claim 25 wherein said vane is curved substantially in accordance with the graph of FIG. 16.

* * * * *